United States Patent
Yang et al.

(10) Patent No.: US 10,476,653 B2
(45) Date of Patent: Nov. 12, 2019

(54) METHOD AND APPARATUS FOR TRANSMITTING CONTROL INFORMATION IN WIRELESS COMMUNICATION SYSTEM

(71) Applicant: LG ELECTRONICS INC., Seoul (KR)

(72) Inventors: Suckchel Yang, Seoul (KR); Joonkui Ahn, Seoul (KR); Hanbyul Seo, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/124,314

(22) PCT Filed: Mar. 25, 2015

(86) PCT No.: PCT/KR2015/002917
§ 371 (c)(1),
(2) Date: Sep. 7, 2016

(87) PCT Pub. No.: WO2015/147543
PCT Pub. Date: Oct. 1, 2015

(65) Prior Publication Data
US 2017/0019236 A1    Jan. 19, 2017

Related U.S. Application Data

(60) Provisional application No. 61/969,833, filed on Mar. 25, 2014, provisional application No. 61/977,608, filed on Apr. 9, 2014.

(51) Int. Cl.
*H04L 5/14* (2006.01)
*H04L 5/00* (2006.01)
(Continued)

(52) U.S. Cl.
CPC ............ *H04L 5/14* (2013.01); *H04L 1/1812* (2013.01); *H04L 5/001* (2013.01); *H04L 5/0055* (2013.01);
(Continued)

(58) Field of Classification Search
CPC ....................................... H04L 5/14
See application file for complete search history.

(56) References Cited

U.S. PATENT DOCUMENTS

2009/0296609 A1    12/2009  Choi et al.
2011/0243066 A1    10/2011  Nayeb Nazar et al.
(Continued)

FOREIGN PATENT DOCUMENTS

EP         2600555          6/2013
KR     10-2014-0023400      2/2014
(Continued)

OTHER PUBLICATIONS

PCT International Application No. PCT/KR2015/002917, Written Opinion of the International Searching Authority dated Jun. 23, 2015, 15 pages.

(Continued)

*Primary Examiner* — Jeffrey M Rutkowski
*Assistant Examiner* — Chae S Lee
(74) *Attorney, Agent, or Firm* — Lee, Hong, Degerman, Kang & Waimey

(57) ABSTRACT

The present invention relates to a wireless communication system. Specifically, the present invention relates to a method for transmitting, by a terminal, control information in an FDD cell, and an apparatus therefor, the method comprising the steps of: receiving sub-frame reconfiguration information for a UL CC; receiving, on the FDD cell, a PDCCH including DCI; receiving, on the FDD cell, a PDSCH indicated by the PDCCH; and transmitting, on the (Continued)

UL CC, HARQ-ACK information on the PDSCH, wherein if the PDSCH is received on a DL CC, the DCI does not include a DAI field, and if the PDSCH is received in the UL CC, the DCI includes a DAI field.

4 Claims, 16 Drawing Sheets

(51) Int. Cl.
*H04W 72/04* (2009.01)
*H04L 1/18* (2006.01)

(52) U.S. Cl.
CPC ..... *H04W 72/042* (2013.01); *H04W 72/0406* (2013.01); *H04W 72/0446* (2013.01)

(56) References Cited

U.S. PATENT DOCUMENTS

| | | | |
|---|---|---|---|
| 2012/0063373 A1 | 3/2012 | Chincholi et al. | |
| 2013/0083707 A1 | 4/2013 | Wang | |
| 2013/0301586 A1* | 11/2013 | Fan | H04L 1/0073 370/329 |
| 2014/0301290 A1 | 10/2014 | He et al. | |
| 2015/0043394 A1* | 2/2015 | Lin | H04L 1/1861 370/280 |
| 2016/0255649 A1* | 9/2016 | Kusashima | H04W 28/06 370/280 |
| 2016/0337110 A1* | 11/2016 | Yang | H04L 1/1854 |
| 2016/0374082 A1* | 12/2016 | Nguyen | H04W 72/044 |
| 2017/0105198 A1* | 4/2017 | Fu | H04L 5/00 |

FOREIGN PATENT DOCUMENTS

| | | |
|---|---|---|
| WO | 2013138715 | 9/2013 |
| WO | 2013157844 | 10/2013 |

OTHER PUBLICATIONS

PCT International Application No. PCT/KR2015/002918, Written Opinion of the International Searching Authority dated Jun. 16, 2015, 18 pages.

ETRI, "Remaining Issues on HARQ timing for TDD-FDD CA," 3GPP TSG-RAN WG1 #76, R1-140215, Feb. 2014, 4 pages.

Samsung, "DL HARQ timing for TDD-FDD CA," 3GPP TSG-RAN WG1 #76, R1-140359, Feb. 2014, 5 pages.

Huawei, "Motivation of New SI proposal: Evolving LTE with Flexible Duplex for Traffic Adaptation," 3GPP TSG-RAN WG1 #63, RP-140062, Feb. 2014, 2 pages.

U.S. Appl. No. 15/124,658, Office Action dated Nov. 3, 2017, 12 pages.

* cited by examiner

METHOD AND APPARATUS FOR TRANSMITTING CONTROL INFORMATION IN WIRELESS COMMUNICATION SYSTEM

CROSS-REFERENCE TO RELATED APPLICATIONS

This application is the National Stage filing under 35 U.S.C. 371 of International Application No. PCT/KR2015/002917, filed on Mar. 25, 2015, which claims the benefit of U.S. Provisional Application No. 61/969,833, filed on Mar. 25, 2014 and 61/977,608, filed on Apr. 9, 2014, the contents of which are all hereby incorporated by reference herein in their entirety.

TECHNICAL FIELD

The present invention relates to a wireless communication system and, more particularly, to a method for transmitting control information in a wireless communication system and an apparatus for the same.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of CDMA (code division multiple access) system, FDMA (frequency division multiple access) system, TDMA (time division multiple access) system, OFDMA (orthogonal frequency division multiple access) system, SC-FDMA (single carrier frequency division multiple access) system and the like.

DISCLOSURE

Technical Problem

One object of the present invention is to provide a method of efficiently transmitting/receiving control information in a wireless communication and an apparatus for efficiently transmitting/receiving control information. Another object of the present invention is to provide a method of efficiently transmitting/receiving a control channel signal and an apparatus for efficiently transmitting/receiving a control channel signal.

Technical tasks obtainable from the present invention are non-limited the above-mentioned technical task. And, other unmentioned technical tasks can be clearly understood from the following description by those having ordinary skill in the technical field to which the present invention pertains.

Technical Solution

In one aspect of the present invention, a method for enabling a UE to transmit control information through an FDD cell, which includes an uplink component carrier (UL CC) and a downlink CC (DL CC), in a wireless communication system comprises the steps of receiving sub-frame reconfiguration information for the UL CC; receiving, on the FDD cell, a physical downlink control channel (PDCCH) including downlink component information (DCI); receiving, on the FDD cell, a physical downlink shared channel (PDSCH) indicated by the PDCCH; and transmitting, on the UL CC, hybrid automated repeat request acknowledgement (HARQ-ACK) information on the PDSCH, wherein if the PDSCH is received on the DL CC, the DCI does not include a downlink assignment index (DAI) field, and if the PDSCH is received on the UL CC, the DCI includes the DAI field.

In another aspect of the present invention, A UE configured to transmit control information through an FDD cell, which includes an uplink component carrier (UL CC) and a downlink CC (DL CC), in a wireless communication system comprises a radio frequency (RF) unit; and a processor, wherein the processor is configured to receive sub-frame reconfiguration information for the UL CC, receive, on the FDD cell, a physical downlink control channel (PDCCH) including downlink component information (DCI), receive, on the FDD cell, a physical downlink shared channel (PDSCH) indicated by the PDCCH, and transmit, on the UL CC, hybrid automated repeat request acknowledgement (HARQ-ACK) information on the PDSCH, and if the PDSCH is received on the DL CC, the DCI does not include a downlink assignment index (DAI) field, and if the PDSCH is received on the UL CC, the DCI includes the DAI field.

Preferably, the DCI may include a 3-bit HARQ process number field if the PDSCH is received on the DL CC, and may include a 4-bit HARQ process number field if the PDSCH is received on the UL CC.

Preferably, the DCI may be received through a common search space (CSS) or a UE-specific SS (USS) if the PDSCH is received on the DL CC, and may be received through the USS only if the PDSCH is received on the UL CC.

Preferably, the subframe reconfiguration information on the UL CC may indicate time division duplex (TDD) UL-DL configuration, and subframe configuration of the UL CC may be allocated as follows in accordance with the TDD UL-DL configuration:

| Uplink-downlink | Subframe number | | | | | | | | | |
|---|---|---|---|---|---|---|---|---|---|---|
| configuration | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D. |

Preferably, if the PDSCH is received on the UL CC, a timing relation between the PDSCH and the HARQ-ACK may depend on a timing relation of TDD UL-DL configuration #2, #3, #4, or #5, and the timing relation according to the TDD UL-DL configuration may be given as follows:

| TDD UL-DL Configuration | 0 | 1 | 2 | 3 | 4 | 5 | 6 | 7 | 8 | 9 |
|---|---|---|---|---|---|---|---|---|---|---|
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | —, | where subframe n is the subframe at which the HARQ-ACK information is transmitted, subframe n−k is the subframe at which the PDSCH is received, and k is a value within the Table.

Advantageous Effects

According to the present invention, control information can be efficiently transmitted and received in a wireless communication system. And, a control channel signal can be efficiently transmitted and received.

Effects obtainable from the present invention may be non-limited by the above mentioned effect. And, other unmentioned effects can be clearly understood from the following description by those having ordinary skill in the technical field to which the present invention pertains.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Embodiments of the present invention are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) evolves from 3GPP LTE.

While the following description is given, centering on 3GPP LTE/LTE-A for clarity, this is purely exemplary and thus should not be construed as limiting the present invention. It should be noted that specific terms disclosed in the present invention are proposed for convenience of description and better understanding of the present invention, and the use of these specific terms may be changed to other formats within the technical scope or spirit of the present invention.

In a wireless communication system, a user equipment (UE) receives information from a base station (BS) on downlink (DL) and transmits information to the BS on uplink (UL). In LTE(-A), DL transmission is performed using OFDMA and uplink transmission is performed using single carrier frequency division multiple access (SC-FDMA).

Figure 1:
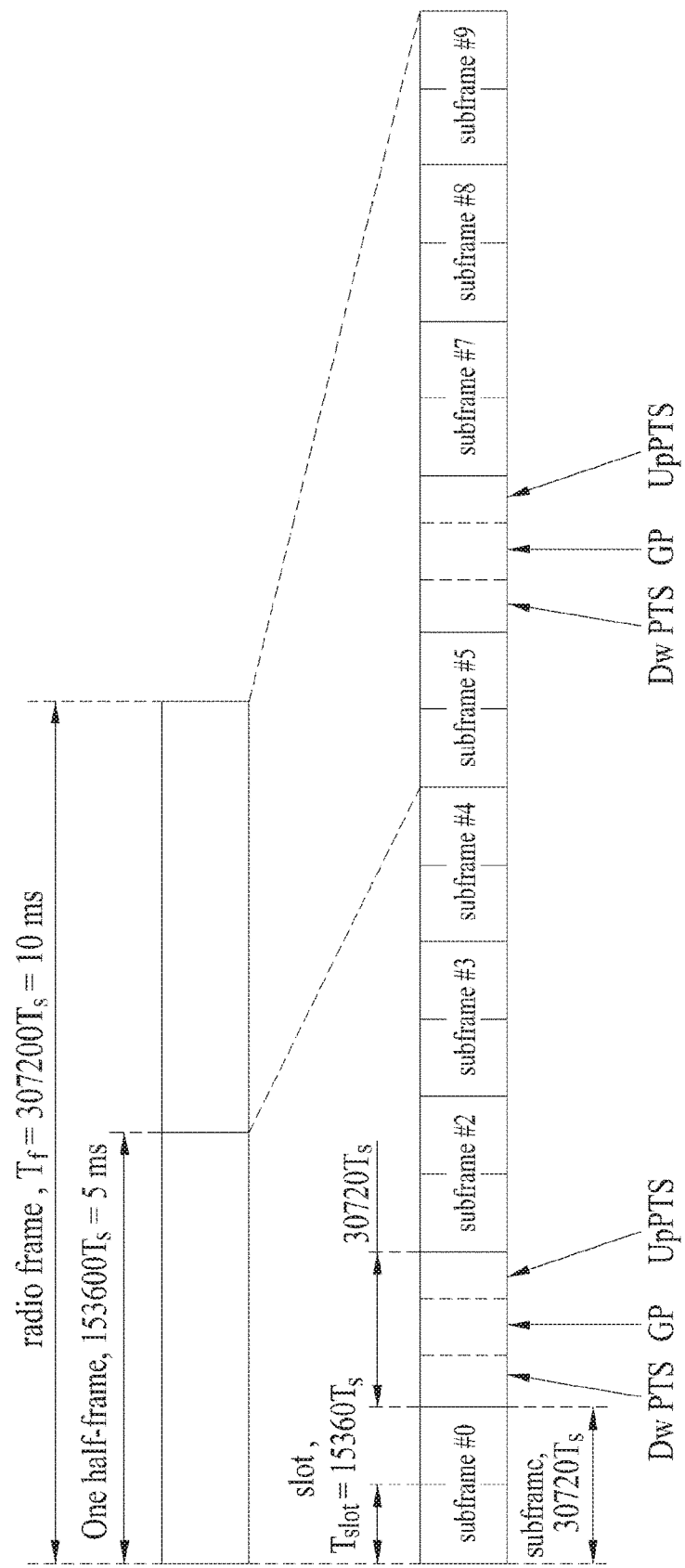
FIG. 1 illustrates a radio frame structure.

FIG. 1 illustrates a radio frame structure.

FIG. 1 illustrates a type-1 radio frame structure for frequency division duplex (FDD). A radio frame includes a plurality of (e.g. 10) subframes each of which includes a plurality of (e.g. 2) slots in the time domain. Each subframe has a duration of 1 ms and each slot has a duration of 0.5 ms. A slot includes a plurality of OFDM/SC-FDMA symbols in the time domain and includes a plurality of resource blocks (RBs) in the frequency domain.

FIG. 1 illustrates a type-2 radio frame structure for time division duplex (TDD). The type-2 radio frame includes 2 half frames. Each half frame includes 5 subframes each of which includes 2 slots.

Table 1 shows UL-DL configurations (Uplink-Downlink Configuration, UL-DL Cfg or UD-cfg) of subframes in a radio frame in the TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

In Table 1, D denotes a downlink subframe, U denotes an uplink subframe and S denotes a special subframe. The special subframe includes DwPTS (Downlink Pilot TimeSlot), GP (Guard Period), and UpPTS (Uplink Pilot TimeSlot). DwPTS is a period reserved for downlink transmission and UpPTS is a period reserved for uplink transmission.

Figure 2:
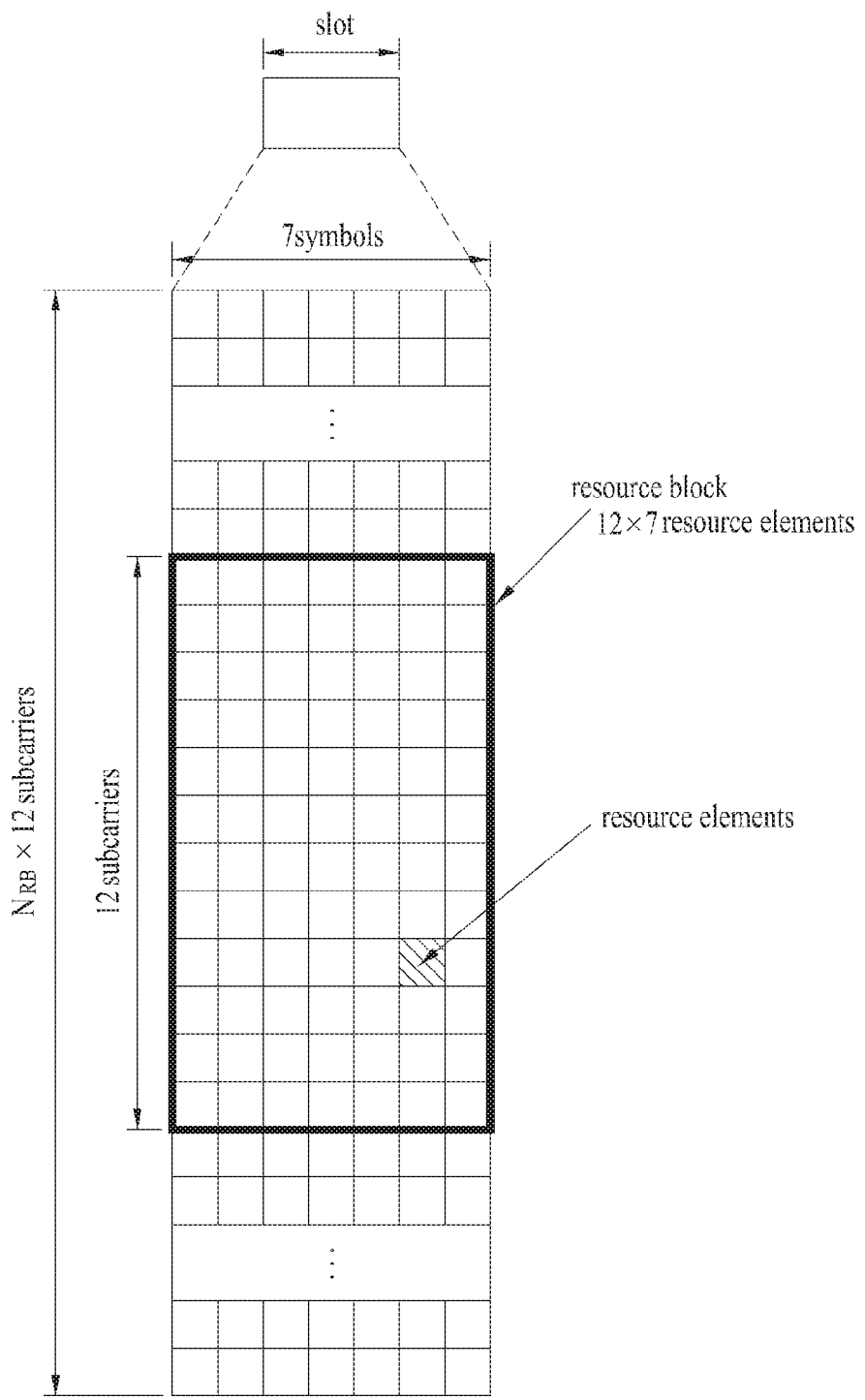
FIG. 2 illustrates a resource grid of a downlink slot.

FIG. 2 illustrates a resource grid of a DL slot.

Referring to FIG. 2, a DL slot includes a plurality of OFDMA (or OFDM) symbols in the time domain. One DL slot may include 7(6) OFDMA symbols according to cyclic prefix (CP) length, and one resource block (RB) may include 12 subcarriers in the frequency domain. Each element on the resource grid is referred to as a resource element (RE). One RB includes 12×7(6) REs. The number $N_{RB}$ of RBs included in the downlink slot depends on a downlink transmit bandwidth. The structure of a UL slot may be same as that of the DL slot except that OFDMA symbols by replaced by SC-FDMA symbols.

Figure 3:
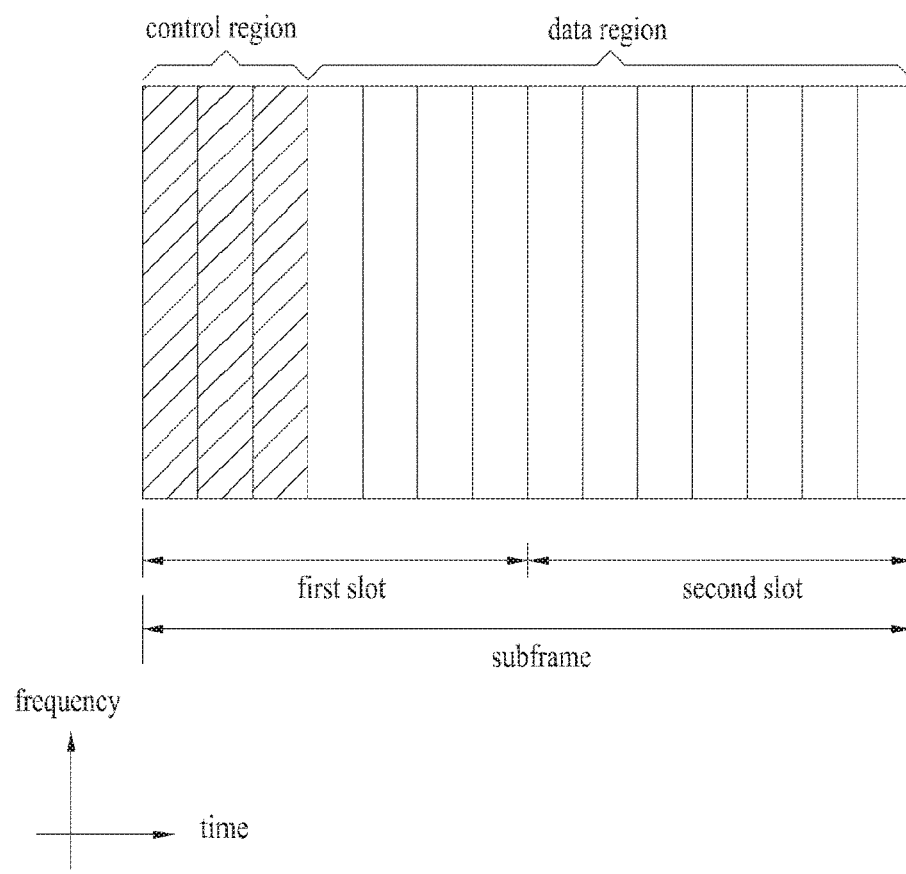
FIG. 3 illustrates a downlink subframe structure.

FIG. 3 illustrates a DL subframe structure.

Referring to FIG. 3, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. Examples of DL control channels include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ-ACK signal.

A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. Downlink control information (DCI) is transmitted through the PDCCH. DCI formats 0/4 (referred to as UL DCI formats hereinafter) for UL scheduling (or UL grant (UG)) and DCI formats 1/1A/1B/1C/1D/2/2A/2B/2C/2D (referred to as DL DCI formats) DL scheduling are defined. The DCI formats selectively include information such as hopping flag, RB allocation, MCS (Modulation Coding Scheme), RV (Redundancy Version), NDI (New Data Indicator), TPC (Transmit Power Control), DMRS (Demodulation Reference Signal) cyclic shift, etc. as necessary.

A plurality of PDCCHs can be transmitted within a control region. A UE monitors the plurality of PDCCHs per subframe in order to check a PDCCH destined for the UE. The PDCCH is transmitted through one or more control channel elements (CCEs). A PDCCH coding rate may be controlled by the number of CCEs (i.e. CCE aggregation level) used for PDCCH transmission. A CCE includes a plurality of resource element groups (REGs). A format of the PDCCH and the number of PDCCH bits are determined by the number of CCEs. A BS determines a PDCCH format according to DCI to be transmitted to the UE, and attaches a cyclic redundancy check (CRC) to control information. The CRC is masked with an identifier (e.g. a radio network temporary identifier (RNTI)) according to an owner or usage of the PDCCH. If the PDCCH is for a specific UE, then an identifier (e.g., cell-RNTI (C-RNTI)) of the UE may be masked to the CRC. If the PDCCH is for a paging message, then a paging identifier (e.g., paging-RNTI (P-RNTI)) may be masked to the CRC. If the PDCCH is for system information (more specifically, a system information block (SIB)), then a system information RNTI (SI-RNTI) may be masked to the CRC. When the PDCCH is for a random access response, then a random access-RNTI (RA-RNTI) may be masked to the CRC.

The PDCCH carries a message known as DCI, and a plurality of PDCCHs are generally transmitted at a subframe. Each PDCCH is transmitted using one or more control channel elements (CCEs), each of which corresponds to nine REGs. One REG corresponds to four resource elements (REs). Four QPSK symbols are mapped into each REG. A resource element (RE) reserved by the reference signal (RS) is not included in the REG. Therefore, a total number of REGs within given OFDM symbols are varied depending on the presence of a cell-specific reference signal. The REG concept is also used for other downlink control channels (that is, PDFICH and PHICH). Four PDCCH formats are supported as listed in Table 2.

TABLE 2

| PDCCH format | Number of CCEs (n) | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

CCEs are used by being numbered continuously. In order to simplify a decoding process, the PDCCH having a format that includes n number of CCEs may start from only CCE having a number equivalent to a multiple of n. The number of CCEs used for transmission of a specific PDCCH is determined by the BS in accordance with a channel state. For example, if the PDCCH is for a UE having a good downlink channel (for example, adjacent to BS), one CCE may be required. However, in case of a UE having a poor channel (for example, adjacent to the cell edge), eight CCEs may be required to obtain sufficient robustness. Also, a power level of the PDCCH may be adjusted to correspond to the channel state.

The LTE system defines a set of CCEs, where the PDCCH may be located for each UE. The set of CCEs, where the UE may discover its PDCCH, may be referred to as a search space (SS). Individual resources within the search space, to which the PDCCH may be transmitted, will be referred to as PDCCH candidates. One PDCCH candidate corresponds to 1, 2, 4, or 8 CCEs depending on a CCE aggregation level. The BS transmits actual PDCCH (DCI) onto a random PDCCH candidate within the search space, and the UE monitors the search space to discover PDCCH (DCI). In more detail, the UE tries blind decoding (BD) for the PDCCH candidates within the search space.

In the LTE, the search space for each PDCCH format may have different sizes. A dedicated SS (or UE-specific SS, USS) and a common search space are defined. The USS is configured separately for each UE, and the range of the CSS is notified to all UEs. The USS and the CSS may be overlapped for the given UE.

Since the search spaces (SSs) may be configured in small size and may overlap each other, it may be impossible for the BS to search for CCE resources for transmitting a PDCCH to all desired UEs within a given subframe. That is, since CCE resources have already been allocated to other UEs, CCE resources for a specific UE may no longer be present in a search space of the specific UE (blocking). In order to minimize the possibility of blocking to be sustained at the next subframe, a UE-specific hopping sequence is applied to the start position of the dedicated search space. Table 3 illustrates sizes of the common and dedicated search spaces.

TABLE 3

| PDCCH format | Number of CCEs (n) | Number of candidates in common search space | Number of candidates in dedicated search space |
|---|---|---|---|
| 0 | 1 | — | 6 |
| 1 | 2 | — | 6 |
| 2 | 4 | 4 | 2 |
| 3 | 8 | 2 | 2 |

Figure 4:
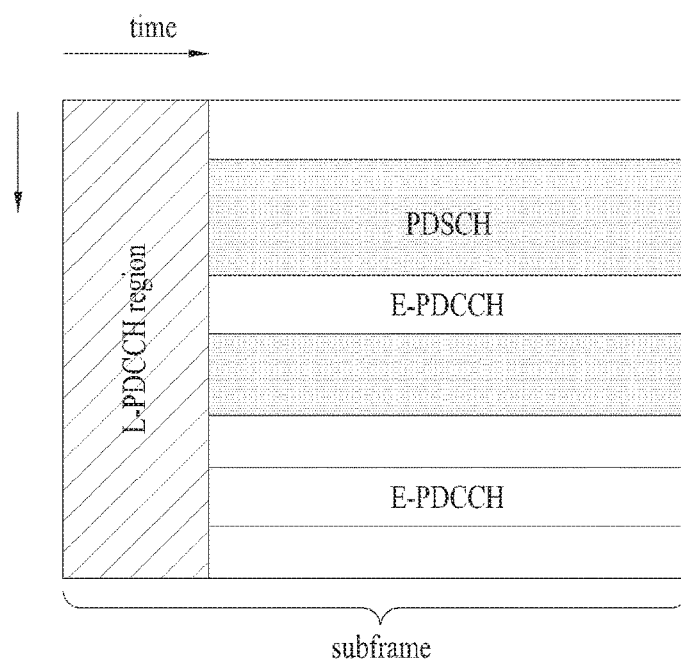
FIG. 4 illustrates an example of Enhanced Physical Downlink Control Channel (EPDCCH)
Figure 5:
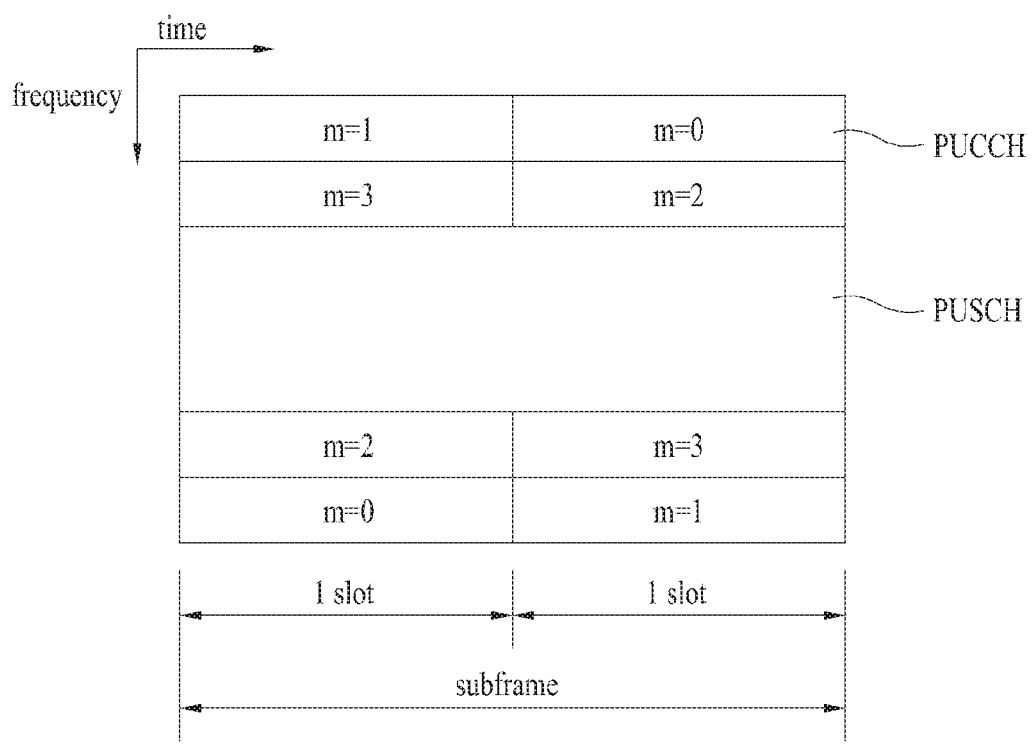
FIG. 5 illustrates the structure of an uplink subframe.

FIG. 4 illustrates an EPDCCH. The EPDCCH is a channel additionally introduced in LTE-A.

Referring to FIG. 4, a PDCCH (for convenience, legacy PDCCH or L-PDCCH) according to legacy LTE/LTE-A may be allocated to a control region (see FIG. 4) of a subframe. In the figure, the L-PDCCH region means a region to which a legacy PDCCH may be allocated. Meanwhile, a PDCCH may be further allocated to the data region (e.g., a resource region for a PDSCH). A PDCCH allocated to the data region is referred to as an E-PDCCH. As shown, control channel resources may be further acquired via the E-PDCCH to mitigate a scheduling restriction due to restricted control channel resources of the L-PDCCH region. Similarly to the L-PDCCH, the E-PDCCH carries DCI. For example, the E-PDCCH may carry downlink scheduling information and uplink scheduling information. For example, the UE may receive the E-PDCCH and receive data/control information via a PDSCH corresponding to the E-PDCCH. In addition, the UE may receive the E-PDCCH and transmit data/control information via a PUSCH corresponding to the E-PDCCH. The E-PDCCH/PDSCH may be allocated starting from a first OFDM symbol of the subframe, according to cell type. In this specification, the PDCCH includes both L-PDCCH and EPDCCH unless otherwise noted.

Figure 6:
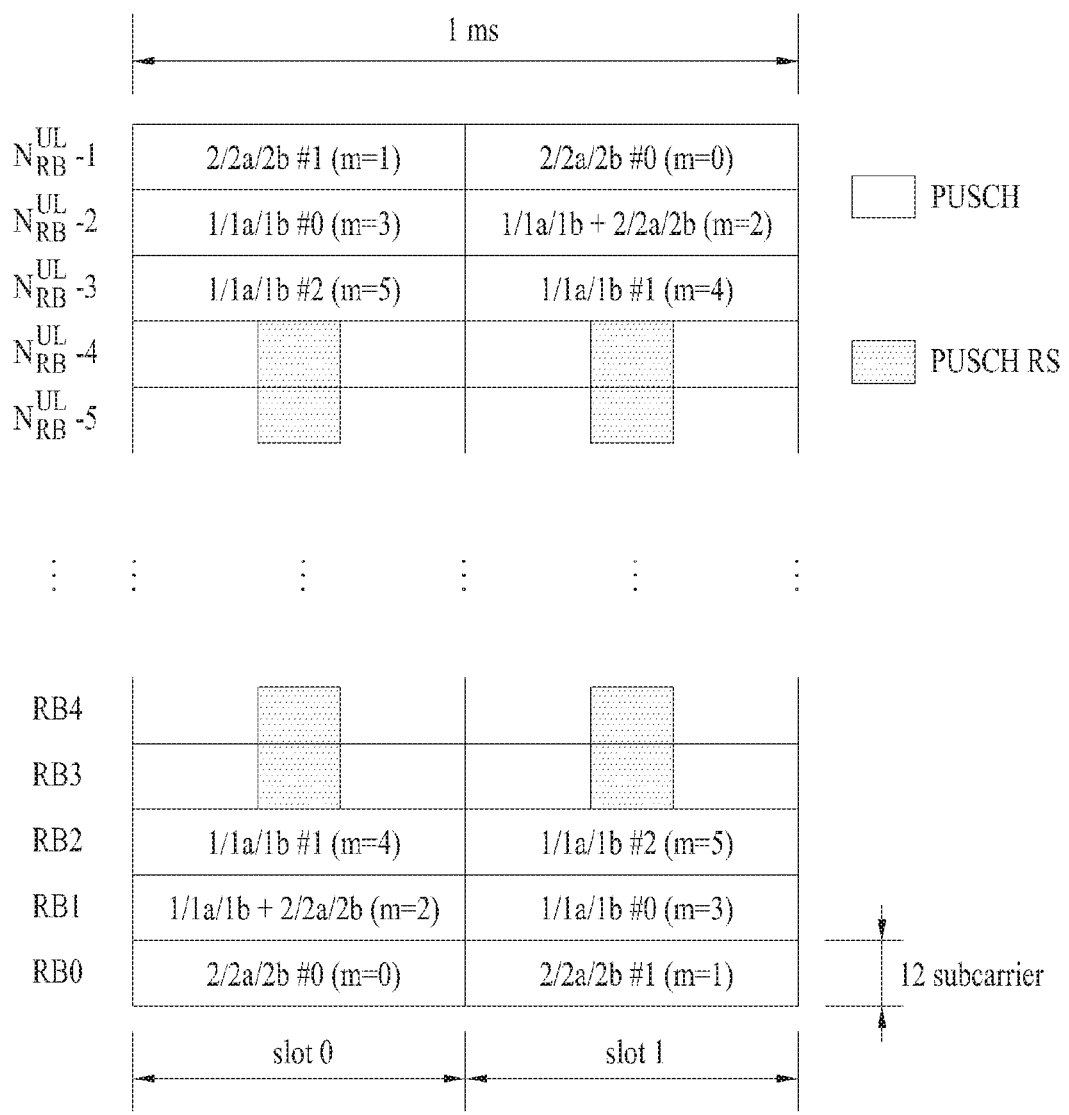
FIG. 6 illustrates an example of physically mapping a PUCCH format to a PUCCH region.

FIG. 6 illustrates a UL subframe structure.

Referring to FIG. 6, a UL subframe includes a plurality of (e.g. 2) slots. A slot may include different numbers of SC-FDMA symbols according to CP lengths. The UL subframe is divided into a control region and a data region in the frequency domain. The data region is used to carry a data signal such as audio data through a physical uplink shared channel (PUSCH). The control region is used to carry uplink control information (UCI) through a physical uplink control channel (PUCCH). The PUCCH includes an RB pair located at both ends of the data region in the frequency domain and hopped in a slot boundary.

The PUCCH can be used to transmit the following control information.

SR (scheduling request): This is information used to request a UL-SCH resource and is transmitted using On-Off Keying (OOK) scheme.

HARQ-ACK: This is an acknowledgement signal for a DL signal (e.g. a PDSCH or SPS release PDCCH). For example, a 1-bit ACK/NACK signal is transmitted as a response to a single DL codeword and a 2-bit ACK/NACK signal is transmitted as a response to two DL codewords.

CSI (channel state information): This is feedback information about a DL channel. The CSI includes a CQI (channel quality indicator), RI (rank indicator), PMI (precoding matrix indicator), PTI (precoding type indicator), etc.

Table 4 shows the mapping relationship between PUCCH formats and UCI in LTE(-A).

TABLE 4

| PUCCH format | UCI (Uplink Control Information) |
|---|---|
| Format 1 | SR (Scheduling Request) (non-modulated waveform) |
| Format 1a | 1-bit HARQ ACK/NACK (SR exist/non-exist) |
| Format 1b | 2-bit HARQ ACK/NACK (SR exist/non-exist) |
| Format 2 | CSI (20 coded bits) |
| Format 2 | CSI and 1- or 2-bit HARQ ACK/NACK (20 bits) (corresponding to only extended CP) |
| Format 2a | CSI and 1-bit HARQ ACK/NACK (20 + 1 coded bits) |
| Format 2b | CSI and 2-bit HARQ ACK/NACK (20 + 2 coded bits) |
| Format 3 (LTE-A) | HARQ ACK/NACK + SR (48 coded bits) |

FIG. 6 illustrates an example of physically mapping PUCCH formats to PUCCH regions.

Referring to FIG. 6, the PUCCH formats are mapped to RBs in the order of PUCCH formats 2/2a/2b (CQI) (e.g. PUCCH region m=0, 1), PUCCH formats 2/2a/2b (CQI) or PUCCH formats 1/1a/1b (SR/HARQ ACK/NACK) (e.g. PUCCH region m=2 if present) and PUCCH formats 1/1a/1b (SR/HARQ ACK/NAKC) (e.g. PUCCH region m=3, 4, 5) from the band edge to the inside and transmitted. The number $N_{RB}^{(2)}$ of PUCCH RBs that can be used for PUCCH format 2/2a/2b (CQI) is signaled to the UE through broadcast signaling in the cell.

Figure 7:
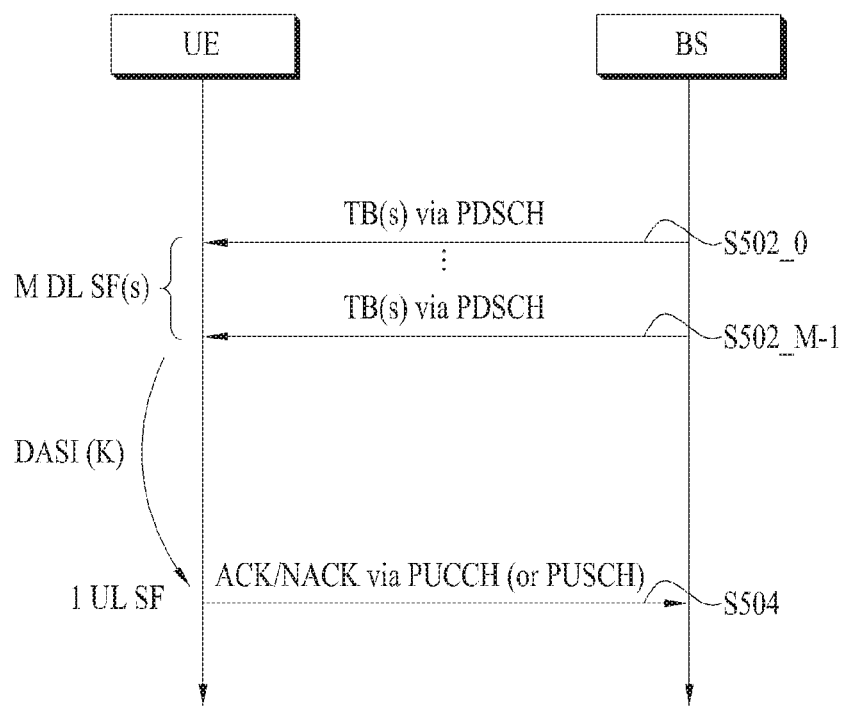
FIGS. 7 and 8 illustrate ACK/NACK(A/N) timing (or HARQ timing)
Figure 8:
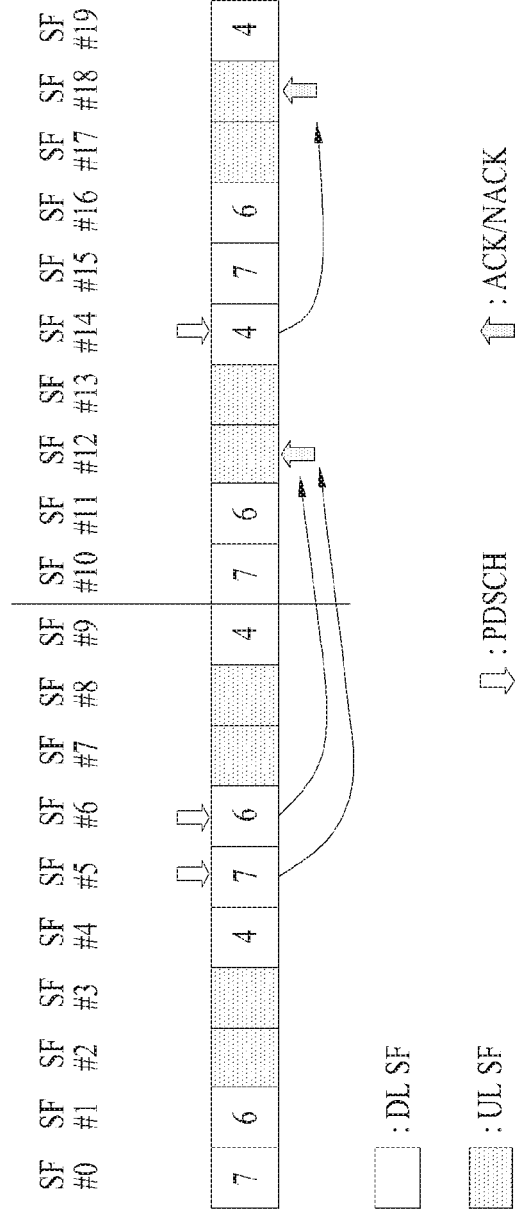

FIGS. 7 and 8 illustrate ACK/NACK (A/N) timing (or HARQ timing).

Referring to FIG. 7, a UE can receive one or more PDSCH signals in M DL subframes (SFs) (S502_0 to S502_M−1). Each PDSCH signal is used to transmit one or more (e.g. 2) transport blocks (TBs) according to transmission mode. A PDCCH signal indicating SPS (Semi-Persistent Scheduling) may also be received in step S502_0 to S502_M−1, which is not shown. When a PDSCH signal and/or an SPS release PDCCH signal is present in the M DL subframes, the UE transmits ACK/NACK through a UL subframe corresponding to the M DL subframes via processes for transmitting ACK/NACK (e.g. ACK/NACK (payload) generation, ACK/NACK resource allocation, etc.) (S504). ACK/NACK includes acknowledgement information about the PDSCH signal and/or an SPS release PDCCH received in step S502_0 to S502_M−1. While ACK/NACK is transmitted through a PUCCH basically, ACK/NACK is transmitted through a PUSCH when a PUSCH is transmitted at ACK/NACK transmission time. Various PUCCH formats shown in Table 4 can be used for ACK/NACK transmission. To reduce the number of ACK/NACK bits transmitted through a PUCCH format, various methods such as ACK/NACK bundling and ACK/NACK channel selection can be used.

In FDD, M=1, and in TDD, M is an integer or 1 or more. In TDD, a relationship between M DL subframes and UL subframes at which A/N is transmitted is given by a downlink association set index (DASI).

Table 5 illustrates a DASI (K: $\{k_0, k_1, k_{M-1}\}$) defined for LTE(-A). If a PDCCH indicating PDSCH transmission and/or semi-persistent scheduling (SPS) release is present at subframe n−k (k∈K), a UE transmits ACK/NACK at subframe n. In FDD, DASI (for convenience, $d_F$)=4.

TABLE 5

| TDD UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In case of TDD mode operation, the UE should transmit A/N signals for one or more DL transmissions (e.g., PDSCH), which are received through M DL SFs, through one UL SF. The A/N signals for a plurality of DL SFs are transmitted through one UL SF as follows.

1) ACK/NACK bundling (A/N bundling): A/N bits for a plurality of data units (e.g., PDSCH, SPS release PDCCH, etc.) are combined by logic-AND operation. For example, if all data units are decoded successfully, an Rx node (e.g., UE) transmits an ACK signal. By contrast, if any one of all data units is failed in decoding (or detection), the Rx node either transmits a NACK signal or transmits none of the ACK signal and the NACK signal.

2) Channel selection (CHsel): A UE which has received a plurality of data units (e.g., PDSCH, SPS release PDCCH, etc.) reserves a plurality of PUCCH resources for A/N transmission. A/N responses to the plurality of data units are identified by combination PUCCH resources used for actual A/N transmission and A/N contents (e.g., bit value and QPSK symbol value) which are transmitted. The channel selection scheme is also referred to as an A/N selection scheme or a PUCCH selection scheme.

Table 6 illustrates a PUCCH selection transmission scheme (M=4) defined in the LTE system.

TABLE 6

| HARQ-ACK(0), HARQ-ACK(1), HARQ-ACK(2), HARQ-ACK(3) | $n^{(1)}_{PUCCH,X}$ | Subframe b(0), b(1) |
|---|---|---|
| ACK, ACK, ACK, ACK | $n^{(1)}_{PUCCH,1}$ | 1, 1 |
| ACK, ACK, ACK, NACK/DTX | $n^{(1)}_{PUCCH,1}$ | 1, 0 |
| NACK/DTX, NACK/DTX, NACK, DTX | $n^{(1)}_{PUCCH,2}$ | 1, 1 |
| ACK, ACK, NACK/DTX, ACK | $n^{(1)}_{PUCCH,1}$ | 1, 0 |
| NACK, DTX, DTX, DTX | $n^{(1)}_{PUCCH,0}$ | 1, 0 |
| ACK, ACK, NACK/DTX, NACK/DTX | $n^{(1)}_{PUCCH,1}$ | 1, 0 |
| ACK, NACK/DTX, ACK, ACK | $n^{(1)}_{PUCCH,3}$ | 0, 1 |
| NACK/DTX, NACK/DTX, NACK/DTX, NACK | $n^{(1)}_{PUCCH,3}$ | 1, 1 |
| ACK, NACK/DTX, ACK, NACK/DTX | $n^{(1)}_{PUCCH,2}$ | 0, 1 |
| ACK, NACK/DTX, NACK/DTX, ACK | $n^{(1)}_{PUCCH,0}$ | 0, 1 |
| ACK, NACK/DTX, NACK/DTX, NACK/DTX | $n^{(1)}_{PUCCH,0}$ | 1, 1 |
| NACK/DTX, ACK, ACK, ACK | $n^{(1)}_{PUCCH,3}$ | 0, 1 |
| NACK/DTX, NACK, DTX, DTX | $n^{(1)}_{PUCCH,1}$ | 0, 0 |
| NACK/DTX, ACK, ACK, NACK/DTX | $n^{(1)}_{PUCCH,2}$ | 1, 0 |
| NACK/DTX, ACK, NACK/DTX, ACK | $n^{(1)}_{PUCCH,3}$ | 1, 0 |
| NACK/DTX, ACK, NACK/DTX, NACK/DTX | $n^{(1)}_{PUCCH,1}$ | 0, 1 |
| NACK/DTX, NACK/DTX, ACK, ACK | $n^{(1)}_{PUCCH,3}$ | 0, 1 |
| NACK/DTX, NACK/DTX, ACK, NACK/DTX | $n^{(1)}_{PUCCH,2}$ | 0, 0 |
| NACK/DTX, NACK/DTX, NACK/DTX, ACK | $n^{(1)}_{PUCCH,3}$ | 0, 0 |
| DTX, DTX, DTX, DTX | N/A | N/A |

In Table 6, HARQ-ACK(i) (0≤i≤3) indicates the HARQ ACK/NACK/DTX result of the i-th data unit. The HARQ ACK/NACK/DTX result means ACK, NACK, DTX (Discontinuous Transmission) or NACK/DTX. DTX represents that there is no transmission of a data unit corresponding to HARQ-ACK(i) or a UE fails to detect the presence of the data unit corresponding to HARQ-ACK(i). Maximum 4 PUCCH resources (i.e., $n^{(1)}_{PUCCH,0} \sim n^{(1)}_{PUCCH,3}$) may be reserved for each data unit. The multiplexed ACK/NACK signal is transmitted through one PUCCH resource selected from the reserved PUCCH resources. In Table 6, $n^{(1)}_{PUCCH,X}$ represents a PUCCH resource used for ACK/NACK transmission, and b(0)b(1) indicates two bits transmitted through the selected PUCCH resource, which are modulated using QPSK. For example, when the UE has decoded 4 data units successfully, the UE transmits bits (1, 1) to a BS through a PUCCH resource linked with $n^{(1)}_{PUCCH,1}$. Since combinations of PUCCH resources and QPSK symbols are not sufficient to represent all available ACK/NACK assumptions, NACK and DTX are coupled except some cases (NACK/DTX, N/D).

FIG. 8 illustrates A/N timing applied to CC for which UL-DL configuration #1 is configured. Each of SF#0~#9 and SF#10~#19 corresponds to a radio frame. Numbers in boxes indicate UL subframes associated with DL subframes. For example, ACK/NACK signal for a PDSCH of SF#5 is transmitted at SF#5+7(=SF#12), and ACK/NACK signal for a PDSCH of SF#6 is transmitted at SF#6+6(=SF#12). That is, ACK/NACK signals for SF#5/SF#6 are all transmitted at SF#12. ACK/NACK signal for a PDSCH of SF#14 is transmitted at SF#14+4(=SF#18).

Figure 9:
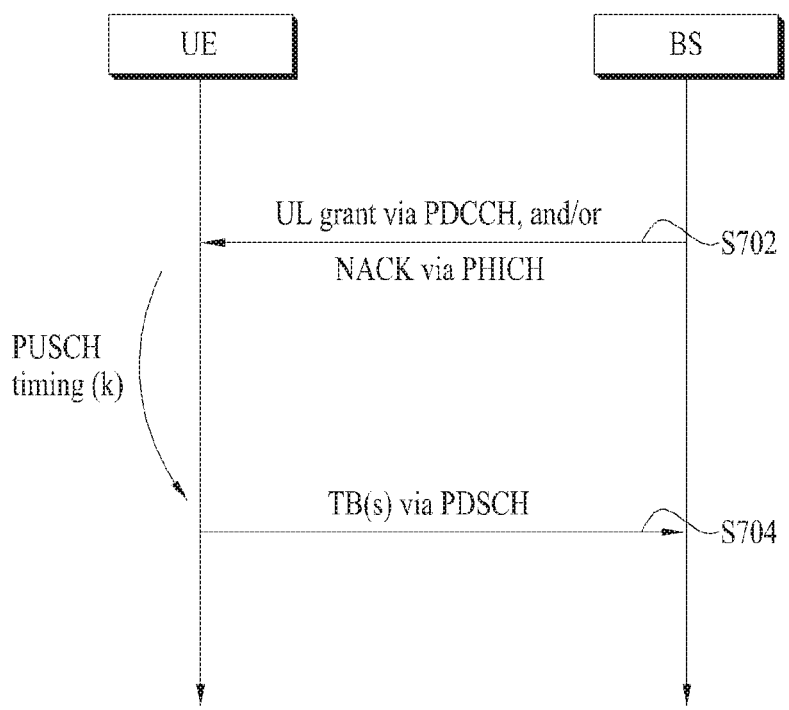
FIGS. 9 and 10 illustrate PHICH/UL grant (UL grant, UG)-PUSCH (Physical Uplink Shared Channel) timing.
Figure 10:
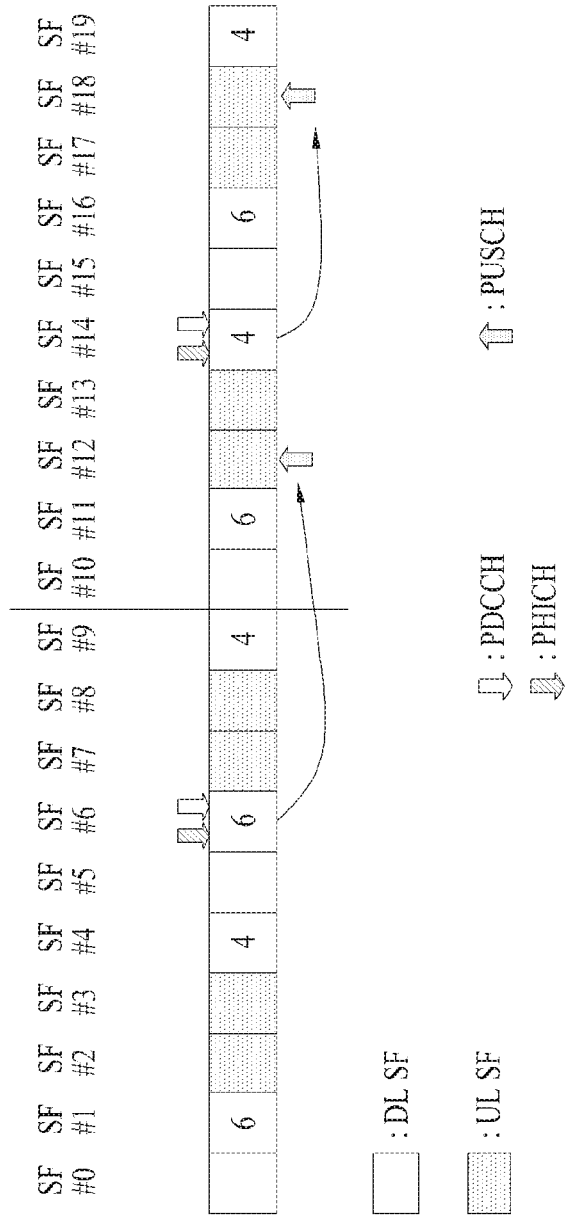

FIGS. 9 and 10 illustrate PHICH grant-PUSCH timing. A PUSCH can be transmitted corresponding to a PDCCH (UL grant) and/or a PHICH (NACK).

Referring to FIG. 9, the UE can receive a PDCCH (UL grant) and/or a PHICH (NACK) through a PDCCH (S702). Here, NACK corresponds to an ACK/NACK response to previous PUSCH transmission. In this case, the UE can initially transmit/retransmit one or more TBs through a PUSCH after k subframes via processes for PUSCH transmission (e.g. TB coding, TB-CW swiping, PUSCH resource allocation, etc.) (S704). The present embodiment is based on the assumption that a normal HARQ operation in which a PUSCH is transmitted once is performed. In this case, a PHICH and a UL grant corresponding to PUSCH transmission are present in the same subframe. However, in case of subframe bundling in which a PUSCH is transmitted multiple times through a plurality of subframes, a PHICH and a UL grant corresponding to PUSCH transmission may be present in different subframes.

Table 7 shows a UAI (Unlink Association Index) (k) for PUSCH transmission in LTE(-A). Table 5 shows spacing between a DL subframe from which a PHICH/UL grant is detected and a UL subframe relating to the DL subframe. Specifically, when a PHICH/UL grant is detected from a subframe n, the UE can transmit a PUSCH in a subframe n+k. In FDD, UAI (i.e., k)=4.

TABLE 7

| TDD UL-DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | 4 | 6 | | | | |
| 1 | | 6 | | | 4 | | | 6 | | 4 |
| 2 | | | | 4 | | | | | 4 | |
| 3 | 4 | | | | | | | 4 | 4 | |
| 4 | | | | | | | | 4 | 4 | |
| 5 | | | | | | | | 4 | | |
| 6 | 7 | 7 | | | | 7 | 7 | | | 5 |

FIG. 10 illustrates PUSCH transmission timing when UL-DL configuration #1 is configured. In the figure, SF#0 to #9 and SF#10 to #19 respectively correspond to radio frames, and numerals in blocks denote UL subframes relating to DL subframes. For example, a PUSCH corresponding to PHICH/UL grant of SF#6 is transmitted in SF#6+6 (=SF#12) and a PUSCH corresponding to a PHICH/UL grant of SF#14 is transmitted in SF#14+4 (=SF#18).

Figure 11:
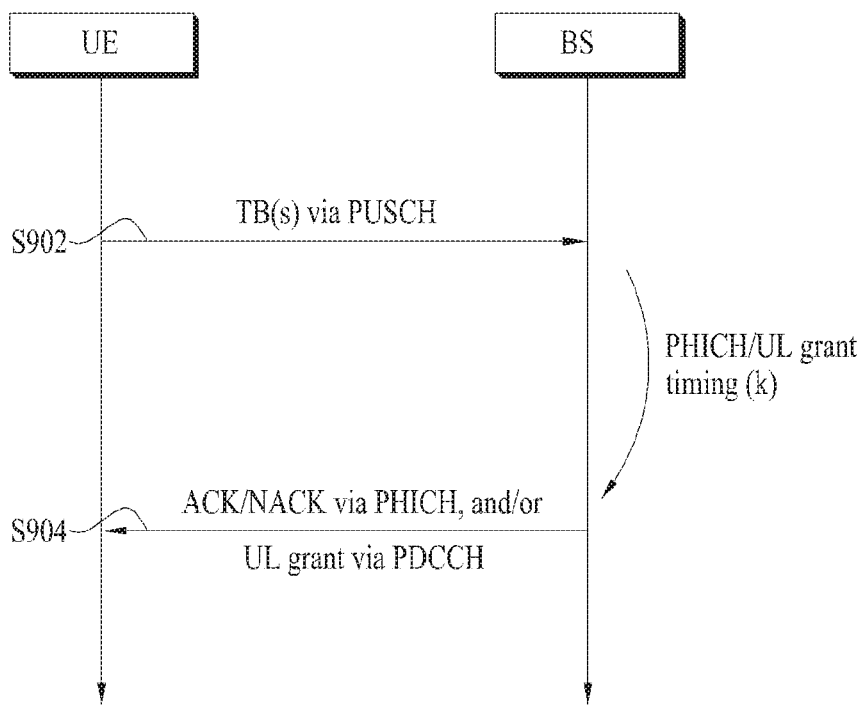
FIGS. 11 and 12 illustrate UL grant (UG)/PHICH timing.
Figure 12:
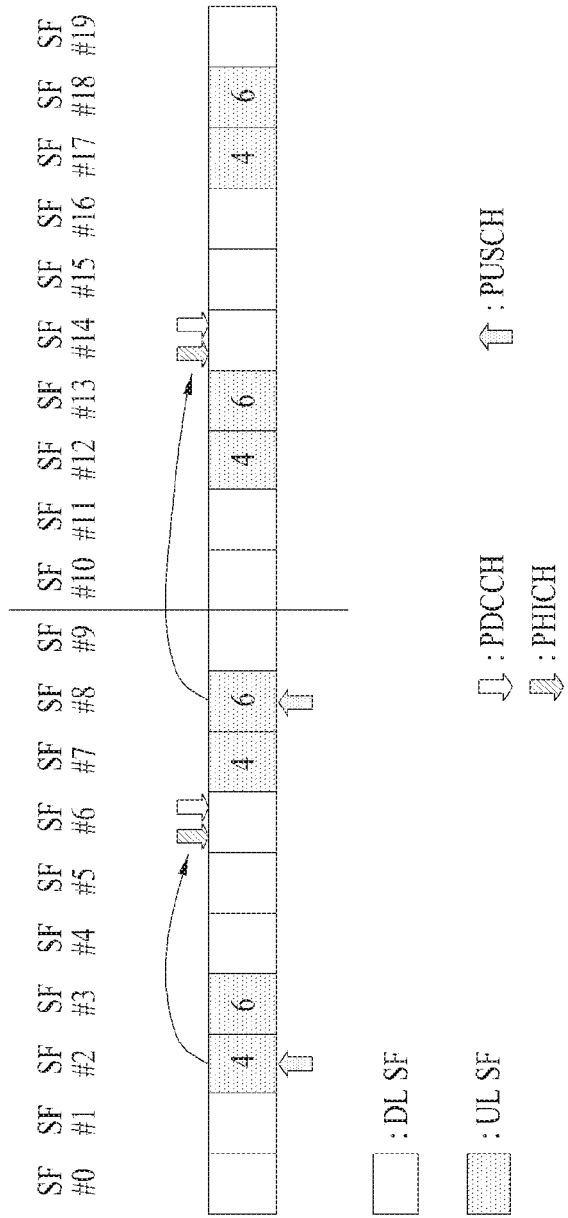

FIGS. 11 and 12 illustrate UL grant (UG)/PHICH timing. A PHICH is used to transmit DL ACK/NACK. Here, DL ACK/NACK means ACK/NACK transmitted on downlink as a response to UL data (e.g. PUSCH).

Referring to FIG. 11, the UE transmits a PUSCH signal to the BS (S902). Here, the PUSCH signal is used to transmit one or a plurality of (e.g. 2) TBs according to transmission mode. The BS can transmit ACK/NACK as a response to PUSCH transmission through a PHICH after k subframes via processes for ACK/NACK transmission (e.g. ACK/NACK generation, ACK/NACK resource allocation, etc.) (S904). ACK/NACK includes acknowledgement information about the PUSCH signal of step S902. When a response to PUSCH transmission is NACK, the BS can transmit a UL grant PDCCH for PUSCH retransmission to the UE after k subframe (S904). The present embodiment is based on the assumption that a normal HARQ operation in which a PUSCH is transmitted once is performed. In this case, a PHICH and UL grant used for PUSCH transmission can be transmitted in the same subframe. In case of subframe bundling, however, the PHICH and UL grant used for PUSCH transmission can be transmitted in different subframes.

Table 8 illustrates PHICH timing defined in TDD. For PUSCH transmission of subframe #n, the UE determines PHICH resource corresponding to subframe #(n+$k_{PHICH}$). In FDD, $k_{PHICH=4}$.

TABLE 8

| TDD UL-DL Configuration | UL subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

FIG. 12 illustrates UL grant/PHICH transmission timing when UL-DL configuration #1 is configured. In the figure, SF#0 to #9 and SF#10 to #19 respectively correspond to radio frames, and numerals in blocks denote DL subframes relating to UL subframes. For example, a UL grant/PHICH corresponding to a PUSCH of SF#2 is transmitted in SF#2+4 (=SF#6) and a UL grant/PHICH corresponding to a PUSCH of SF#8 is transmitted in SF#8+6 (=SF#14).

Figure 13:
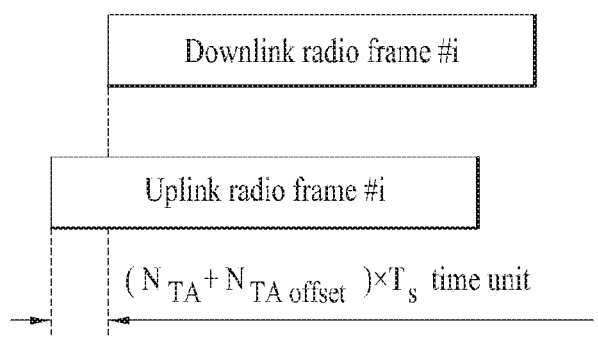
FIG. 13 illustrates uplink-downlink frame timing relation.

FIG. 13 illustrates uplink-downlink frame timing relation.

Referring to FIG. 13, transmission of the uplink radio frame number i starts prior to $(N_{TA}+N_{TAoffset})*T_s$ seconds from the start of the corresponding downlink radio frame. In case of the LTE system, $0 \leq N_{TA} \leq 20512$, $N_{TAoffset}=0$ in FDD, and $N_{TAoffset}=624$ in TDD. The value $N_{Taoffset}$ is a value in advance recognized by the BS and the UE. If $N_{TA}$ is indicated through a timing advance command during a random access procedure, the UE adjusts transmission timing of UL signal (e.g., PUCCH/PUSCH/SRS) through the above equation. UL transmission timing is set to multiples of 16 $T_s$. The timing advance command indicates the change of the UL timing based on the current UL timing. The timing advance command $T_A$ within the random access response is a 11-bit timing advance command, and indicates values of 0, 1, 2, . . . , 1282 and a timing adjustment value is given by $N_{TA}=T_A*16$. In other cases, the timing advance command $T_A$ is a 6-bit timing advance command, and indicates values of 0, 1, 2, . . . , 63 and a timing adjustment value is given by $N_{TA,new}=N_{TA,old}+(T_A-31)*16$. The timing advance command received at subframe n is applied from the beginning of subframe n+6. In case of FDD, as shown, transmitting timing of UL subframe n is advanced based on the start time of the DL subframe n. On the contrary, in case of TDD, transmitting timing of UL subframe n is advanced based on the end time of the DL subframe n+1 (not shown).

Figure 14:
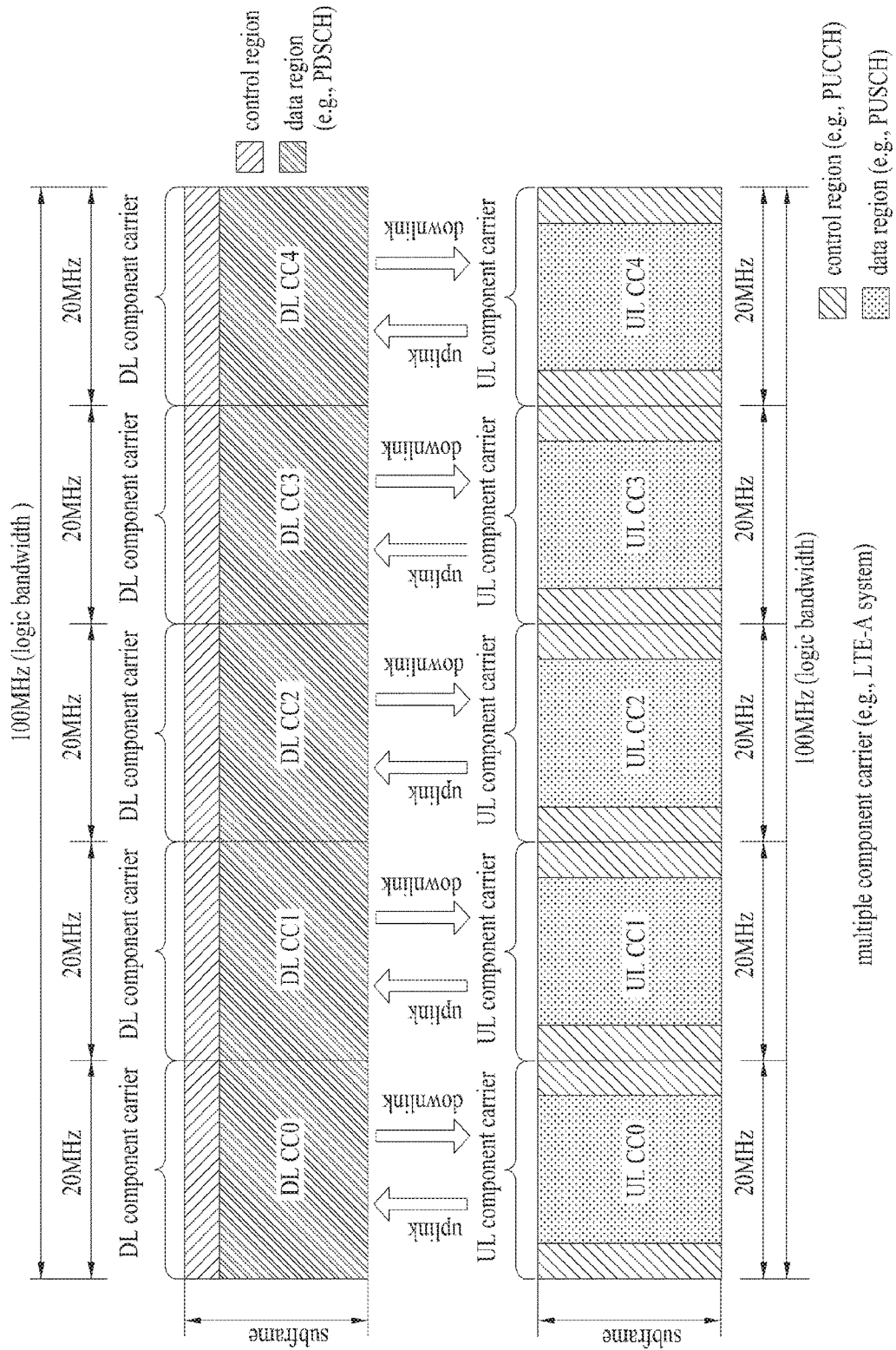
FIG. 14 illustrates a carrier aggregation (CA)-based wireless communication system.

FIG. 14 illustrates a carrier aggregation (CA) communication system. To use a wider frequency band, an LTE-A system employs CA (or bandwidth aggregation) technology which aggregates a plurality of UL/DL frequency blocks to obtain a wider UL/DL bandwidth. Each frequency block is transmitted using a component carrier (CC). The CC can be regarded as a carrier frequency (or center carrier, center frequency) for the frequency block.

Referring to FIG. 14, a plurality of UL/DL CCs can be aggregated to support a wider UL/DL bandwidth. The CCs may be contiguous or non-contiguous in the frequency domain. Bandwidths of the CCs can be independently determined. Asymmetrical CA in which the number of UL CCs is different from the number of DL CCs can be implemented. For example, when there are two DL CCs and one UL CC, the DL CCs can correspond to the UL CC in the ratio of 2:1. A DL CC/UL CC link can be fixed or semi-statically configured in the system. Even if the system bandwidth is configured with N CCs, a frequency band that a specific UE can monitor/receive can be limited to M (<N) CCs. Various parameters with respect to CA can be configured cell-specifically, UE-group-specifically, or UE-specifically. Control information may be transmitted/received only through a specific CC. This specific CC can be referred to as a Primary CC (PCC) (or anchor CC) and other CCs can be referred to as Secondary CCs (SCCs).

In LTE-A, the concept of a cell is used to manage radio resources. A cell is defined as a combination of DL resources and UL resources. Yet, the UL resources are not mandatory. Therefore, a cell may be composed of DL resources only or both DL resources and UL resources. The linkage between the carrier frequencies (or DL CCs) of DL resources and the carrier frequencies (or UL CCs) of UL resources may be indicated by system information when CA is supported. A cell operating in primary frequency resources (or a PCC) may be referred to as a primary cell (PCell) and a cell operating in secondary frequency resources (or an SCC) may be referred to as a secondary cell (SCell). The PCell is used for a UE to establish an initial connection or re-establish a connection. The PCell may refer to a cell indicated during handover. The SCell may be configured after an RRC connection is established and may be used to provide additional radio resources. The PCell and the SCell may collectively be referred to as a serving cell. Accordingly, a single serving cell composed of a PCell only exists for a UE in an RRC_Connected state, for which CA is not set or which does not support CA. On the other hand, one or more serving cells exist, including a PCell and one or more SCells, for a UE in an RRC_CONNECTED state, for which CA is set.

When a plurality of CCs is configured, cross-CC scheduling and non-cross-CC scheduling may be used. Non-cross-CC scheduling corresponds to scheduling in LTE. When cross-CC scheduling is applied, a DL grant PDCCH may be transmitted on DL CC#0 and a PDSCH corresponding thereto may be transmitted on DL CC#2. Similarly, a UL grant PDCCH may be transmitted on DL CC#0 and a PUSCH corresponding thereto may be transmitted on DL CC#4. For cross-CC scheduling, a carrier indicator field (CIF) is used. Presence or absence of a CIF in a PDCCH may be semi-statically and UE-specifically (or UE-group-specifically) configured through higher layer signaling (e.g. RRC signaling).

Scheduling according to the CIF may be arranged as follows.

CIF disabled: a PDCCH on a DL CC is used to allocate a PDSCH resource on the same DL CC or a PUSCH resource on a linked UL CC.

CIF enabled: a PDCCH on a DL CC can be used to allocate a PDSCH or PUSCH resource on a specific DL/UL CC from among a plurality of aggregated DL/UL CCs using the CIF.

When the CIF is present, the BS may allocate a monitoring DL CC to reduce blind detection complexity of the UE. For PDSCH/PUSCH scheduling, the UE may detect/decode a PDCCH only on the corresponding DL CCs. In addition, the BS may transmit a PDCCH only through the monitoring DL CC (set). The monitoring DL CC set may be UE-specifically, UE-group-specifically or cell-specifically configured.

Figure 15:
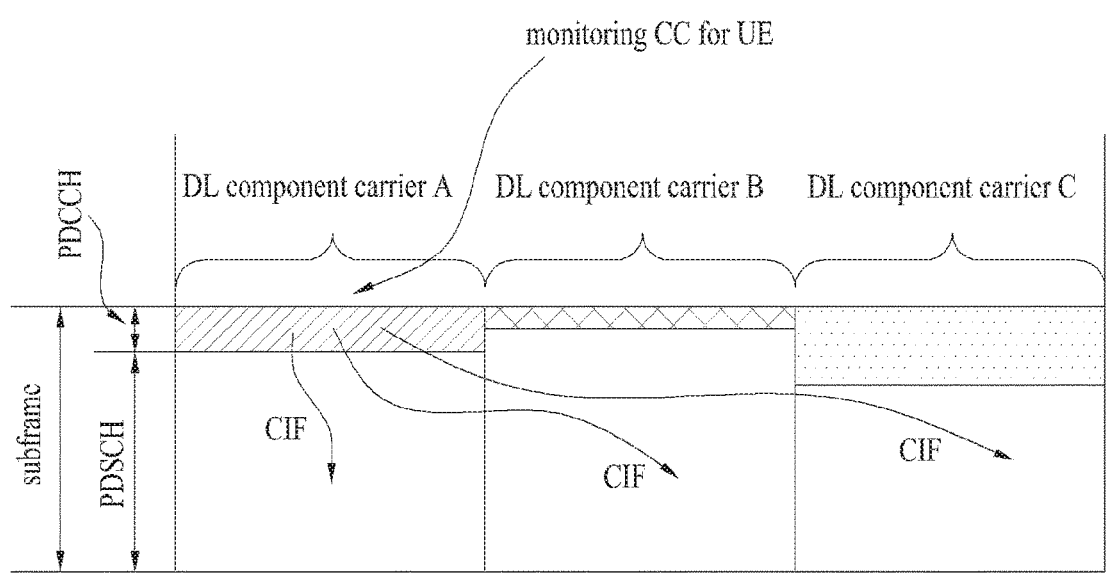
FIG. 15 illustrates a scheduling method when a plurality of cells is configured.

FIG. 15 illustrates cross-carrier scheduling. While the figure shows DL scheduling, cross-carrier scheduling is equally applied to UL scheduling.

Referring to FIG. 15, 3 DL CCs are configured for a UE, and DL CC A may be set as a PDCCH monitoring DL CC. When the CIF is disabled, each DL CC can transmit only a PDCCH that schedules a PDSCH corresponding to the DL CC without a CIF according to LTE PDCCH rule. When the CIF is enabled, DL CC A (i.e. MCC) can transmit not only a PDCCH that schedules the PDSCH corresponding to the DL CC A but also PDCCHs that schedule PDSCHs of other DL CCs using the CIF. In this case, a PDCCH is not transmitted in DL CC B/C.

Here, a specific CC (or cell) used to transmit scheduling information (e.g. PDCCH) is referred to as "monitoring CC (MCC)" which may be replaced by "monitoring carrier", "monitoring cell", "scheduling carrier", "scheduling cell", "scheduling CC", etc. A DL CC on which a PDSCH corresponding to a PDCCH is transmitted and a UL CC on which a PUSCH corresponding to a PUCCH is transmitted may be referred to as a scheduled carrier, a scheduled CC, a scheduled cell, etc. One or more scheduling CCs may be configured per UE. A scheduling CC may include a PCC. When only one scheduling CC is configured, the scheduling CC may be the PCC. The scheduling CC may be UE-specifically, UE-group-specifically or cell-specifically set.

In case of cross-CC scheduling, signal transmission may be performed as follows.

PDCCH (UL/DL grant): scheduling CC (or MCC)

PDSCH/PUSCH: CC indicated by a CIF of a PDCCH detected from a scheduling CC

DL ACK/NACK (e.g. PHICH): scheduling CC (or MCC) (e.g. DL PCC)

UL ACK/NACK (e.g. PUCCH): UL PCC

In the following description, DL ACK/NACK may be referred to as DL A/N or PHICH and UL ACK/NACK may be referred to as UL A/N or A/N for convenience.

For a TDD-configured CC (or cell), when a UE transmits an ACK/NACK signal to a BS, a problem may occur as follows: if the UE has missed a part of PDCCH(s) transmitted from the BS for a period of a plurality of subframes, the UE does not even know that a PDSCH corresponding to the missed PDCCH has been transmitted to the UE and thus an error may occur during generation of ACK/NACK.

To solve this problem, a DL grant PDCCH/SPS release PDCCH for a TDD CC includes a DAI field (i.e., DL DAI field). The value of DL DAI field designates a cumulative value (i.e., counting value) of PDCCH(s) corresponding to PDSCH(s) and PDCCH(s) indicating downlink SPS release to a current subframe within DL subframe(s) n-k (k∈K). For example, if 3 DL subframes correspond to one UL subframe, PDSCHs transmitted at a period of 3 DL subframes are sequentially indexed (i.e., sequentially counted) and the index (or count) is delivered on a PDCCH for scheduling the PDSCHs. The UE may determine whether a previous PDCCH has been appropriately received, by checking DAI information of the PDCCH.

Figure 16:
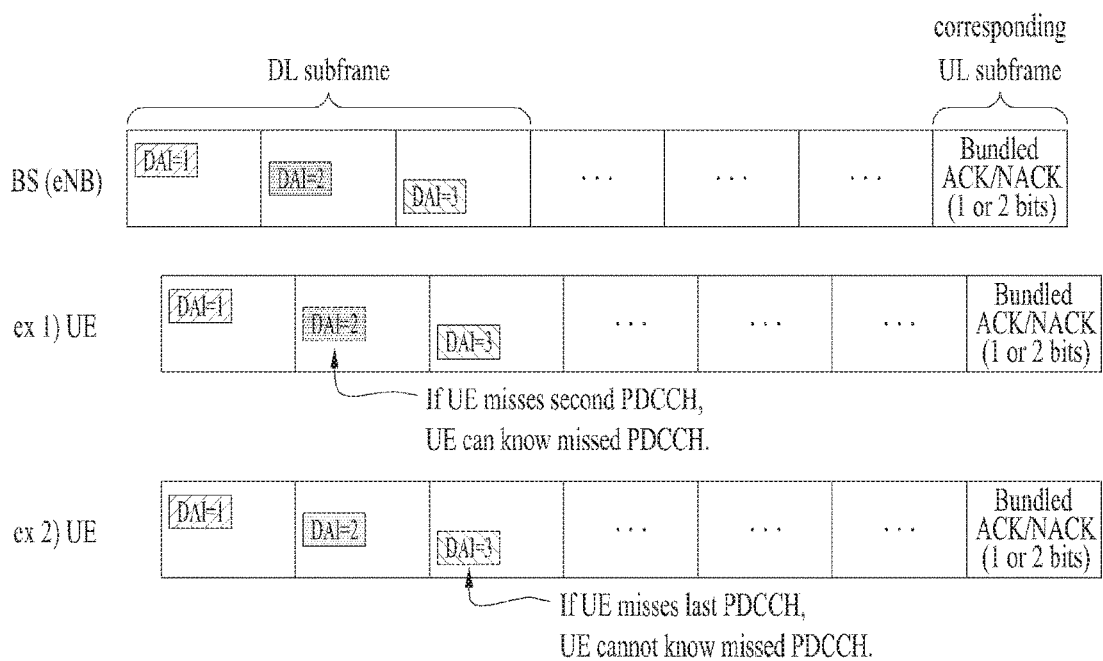
FIG. 16 illustrates ACK/NACK transmission based on DL DAI (Downlink Assignment Index)

FIG. 16 illustrates an ACK/NACK transmission procedure based on a DL DAI. This example assumes a TDD system configured by 3 DL subframes:1 UL subframe. It is assumed for convenience that a UE transmits ACK/NACK using PUSCH resources. In the LTE, when ACK/NACK is transmitted through a PUSCH, 1-bit or 2-bit bundled ACK/NACK is transmitted.

Referring to FIG. 16, if the second PDCCH is missed as shown in the first example (Example 1), since a DL DAI value of the third PDCCH is different from a currently detected number of PDCCHs, the UE may know that the second PDCCH is missed. In this case, the UE may process an ACK/NACK response to the second PDCCH as a NACK (or NACK/DTX). On the other hand, if the last PDCCH is missed as shown in the second example (Example 2), since the last detected DAI value of a PDCCH is equal to a currently detected number of PDCCHs, the UE may not recognize that the last PDCCH is missed (i.e., DTX). Accordingly, the UE recognizes that only two PDCCHs are scheduled for a DL subframe period. In this case, the UE bundles ACK/NACK corresponding to first two PDCCHs and thus an error occurs in an ACK/NACK feedback procedure. To solve this problem, a UL grant PDCCH also includes a DAI field (i.e., UL DAI field). The UL DAI field is a 2-bit field and includes information about the number of scheduled PDCCHs.

Table 9 shows values ($V^{DL}_{DAI}$, $V^{UL}_{DAI}$) indicated by a DAI field within a DCI format. $V^{DL}_{DAI}$ denotes a DL DAI value, and $V^{UL}_{DAI}$ denotes a UL DAI value. $V^{DL}_{DAI}$ denotes the value of the DAI field in DCI format 1/1A/1B/1D/2/2A/2B/2C/2D for UL-DL Configurations #0 to #6. $V^{DL}_{DAI}$ denotes the value of DAI field in DCI format 0/4 (i) if one CC (or cell) having UL-DL configurations #1 to #6 is configured, or (ii) if a UE is configured not to use a PUCCH format 3.

TABLE 9

| DAI<br>MSB, LSB | $V_{DAI}^{UL}$ or $V_{DAI}^{DL}$ | Number of subframes with PDSCH transmission and with PDCCH indicating DL SPS release |
| --- | --- | --- |
| 0, 0 | 1 | 1 or 5 or 9 |
| 0, 1 | 2 | 2 or 6 |
| 1, 0 | 3 | 3 or 7 |
| 1, 1 | 4 | 0 or 4 or 8 |

MSB: Most significant bit.
LSB: Least significant bit.

Table 10 shows a value ($W^{UL}_{DAI}$) indicated by a DAI field in DCI format 0/4. $W^{UL}_{DAI}$ denotes the value of DAI field in DCI format 0/4 (i) if a plurality of CCs (or cells) having UL-DL Configurations #1 to #6 are configured, or (ii) if one CC (or cell) having UL-DL Configurations #1 to #6 is configured and a UE is configured to use a PUCCH format 3.

TABLE 10

| DAI<br>MSB, LSB | $W_{DAI}^{UL}$ |
| --- | --- |
| 0, 0 | 1 |
| 0, 1 | 2 |
| 1, 0 | 3 |
| 1, 1 | 4 |

MSB: Most significant bit.
LSB: Least significant bit.

For convenience, unless otherwise mentioned, DL DAI is referred to as V, and UL DAI is referred to as W.

DAI is used in various ways in an ACK/NACK transmission procedure. For example, a DAI may be used for DTX detection as illustrated in FIG. 16, or used in an ACK/NACK payload generating procedure (e.g., determination of the size of ACK/NACK payload and the location of ACK/NACK information in the ACK/NACK payload) or ACK/NACK resource allocation procedure.

First of all, a description is now given of DTX detection using a DAI. In case of $V_{DAI}^{UL} \neq (U_{DAI} + N_{SPS} - 1) \bmod 4 + 1$, a UE generates a NACK for all codewords in accordance with a bundling procedure on the assumption that at least one DL assignment is missed (i.e., DTX occurs). $U_{DAI}$ denotes a total number of DL grant PDCCHs and SPS release PDCCHs detected at subframe n−k (k∈K) (see Table 5). $N_{SPS}$ denotes the number of SPS PDSCHs (0 or 1).

Then, a description is now given of ACK/NACK payload generation using a DAI. It is assumed for convenience that the PUCCH format 3 is configured. ACK/NACK payloads for the PUCCH format 3 are configured per cell and then arranged in the order of cell indexes. Specifically, HARQ-ACK feedback bits for a c-th serving cell (or DL CC) are given as $$o_{c,0}^{ACK} o_{c,1}^{ACK}, \ldots, o_{c,O_c^{ACK}-1}^{ACK} (c \geq 0).$$

$O^{ACK}_c$ denotes the number of bits (i.e., size) of HARQ-ACK payload of the c-th serving cell. Regarding the c-th serving cell, if a transmission mode for supporting transmission of a single transport block (TB) is configured or if space bundling is applied, it may be given as $O^{ACK}_c = B^{DL}_c$.

On the other hand, regarding the c-th serving cell, if a transmission mode for supporting transmission of a plurality of (e.g., 2) TBs is configured and space bundling is not applied, it may be given as $O^{ACK}_c = 2B^{DL}_c$. If the HARQ-ACK feedback bits are transmitted through a PUCCH or if the HARQ-ACK feedback bits are transmitted through a PUSCH but there is no W corresponding to the PUSCH (e.g., SPS-based PUSCH), it is given as $B^{DL}_c = M$. M denotes the number of elements in set K defined in Table 5. If the TDD UL-DL Configurations are #1, #2, #3, #4, and #6 and if the HARQ-ACK feedback bits are transmitted through a PUSCH, it is given as $B^{DL}_c = W^{UL}_{DAI}$. $W^{UL}_{DAI}$ denotes a value indicated by a UL DAI field within a UL grant PDCCH (Table 10), and is simply referred to as W. If the TDD UL-DL Configuration is #5, it is given as $B_c^{DL} = W_{DAI}^{UL} + 4\lceil (U - W_{DAI}^{UL})/4 \rceil$. In this case, U denotes a maximum value among Ucs, and Uc denotes a total number of PDCCHs indicating (downlink) SPS release and PDSCH(s) received at subframe n−k of the c-th serving cell. Subframe n is a subframe for transmitting the HARQ-ACK feedback bits. ⌈ ⌉ denotes a ceiling function.

Regarding the c-th serving cell, if a transmission mode for supporting transmission of a single TB is configured or if space bundling is applied, the location of each ACK/NACK in HARQ-ACK payload of the serving cell is given as $O_{c,DAI(k)-1}^{ACK}$. DAI(k) denotes a DL DAI value of a PDCCH detected at DL subframe n−k. On the other hand, regarding the c-th serving cell, if a transmission mode for supporting transmission of a plurality of (e.g., 2) TBs is configured and space bundling is not applied, the location of each ACK/NACK in HARQ-ACK payload of the serving cell is given as $O_{c,2DAI(k)-2}^{ACK}$ and $O_{c,2DAI(k)-1}^{ACK}$. $O_{c,2DAI(k)-2}^{ACK}$ denotes HARQ-ACK for codeword 0, and $O_{c,2DAI(k)-1}^{ACK}$ denotes HARQ-ACK for codeword 1. Codeword 0 and codeword 1 may respectively correspond to TB0 and TB1, or TB1 and TB0 according to swapping. If the PUCCH format 3 is transmitted at a subframe configured for SR transmission, the PUCCH format 3 transmits ACK/NACK bits and a 1-bit SR together.

Next, a description will be given of a method for determining an ACK/NACK transmission resource in case of L-PDCCH based scheduling. If PUCCH format 1a/1b (hereinafter, referred to as PF1) is configured for A/N transmission, an ACK/NACK transmission resource for DL data, which is scheduled by a DL grant L-PDCCH, may be determined as a PUCCH resource linked to a specific ECCE index (e.g., minimum ECCE index) constituting the DL grant L-PDCCH (implicit PUCCH resource). Specifically, in the LTE/LTE-A, a PF1 resource index is determined as follows.

$$n^{(1)}_{PUCCH} = n_{CCE} + N^{(1)}_{PUCCH} \qquad \text{[Equation 1]}$$

In this case, $n^{(1)}_{PUCCH}$ indicates a resource index of PF1 for ACK/NACK/DTX transmission, $N^{(1)}_{PUCCH}$ indicates a signaling value received from a higher layer (e.g., Radio Resource Control (RRC)), and $n_{CCE}$ indicates the smallest value from among CCE indexes used for L-PDCCH transmission. A CS (Cyclic Shift), an OC (Orthogonal Code) and a PRB (Physical Resource Block) for PF1 are obtained from $n^{(1)}_{PUCCH}$.

If the PUCCH format 3 (PF3) is configured for A/N transmission, a specific PF3 resource index among a plurality of PF3 resource indexes ($n^{(3)}_{PUCCH}$) allocated by a higher layer (e.g., RRC) can be indicated by an ARI (ACK/NACK Resource Indicator) of the DL grant L-PDCCH (explicit PUCCH resource). The ARI is transmitted through a TPC field of an L-PDCCH that schedules a PDSCH of an SCell. An OC and a PRB for PF3 are obtained from $n^{(3)}_{PUCCH}$.

Meanwhile, even in case of EPDCCH based scheduling, an ACK/NACK transmission resource for DL data scheduled by a DL grant EPDCCH can be determined as a PUCCH resource linked to a specific ECCE index (e.g., minimum ECCE index) constituting the DL grant EPDCCH or an ECCE index obtained by adding a specific offset value to the specific ECCE index. Also, an ACK/NACK feedback transmission resource can be determined as a PUCCH resource linked to a specific ECCE index (e.g., minimum ECCE index) constituting the DL grant EPDCCH or an ECCE index obtained by adding a specific offset value to the specific ECCE index. In this case, the specific offset value can be determined by a value, which is directly signaled through an ARO (ACK/NACK Resource Offset) field in the DL grant EPDCCH, and/or a value designated per AP (Antenna Port). Specifically, information signaled through the TPC field and the ARO field in the DL grant EPDCCH in accordance with frame structure type (e.g., FDD or TDD) and feedback transmission method (e.g., PF3 or CHsel) can be configured as follows. For convenience, a TPC command for PUCCH power control is defined as "TPC value", an offset value added when an implicit PUCCH index is determined is defined as "ARO value", and an ARI that indicates a specific one of a plurality of PF3 indexes or a plurality of PF1 indexes (groups) allocated through RRC is defined as "ARI value". In addition, a fixed value (e.g., "0") that is inserted (for virtual CRC or the like) without containing no information is defined as "fixed value".

1) FDD with PF3
A. TPC field
   i. DL grant that schedules a PCell: TPC value
   ii. DL grant that schedules an SCell: ARI value
B. ARO field
   i. DL grant that schedules a PCell: ARO value
   ii. DL grant that schedules an SCell: fixed value
2) FDD with CHsel
A. TPC field
   i. DL grant that schedules a PCell: TPC value
   ii. DL grant that schedules an SCell: ARI value
B. ARO field
   i. DL grant transmitted through a PCell: ARO value
   ii. DL grant transmitted through an SCell: fixed value 3) TDD with PF3
A. TPC field
   i. DL grant that schedules a PCell: TPC value
   ii. DL grant that schedules an SCell: ARI value
B. ARO field
   i. DL grant that schedules a PCell and corresponds to DAI=1: ARO value
   ii. DL grant that schedules a PCell and does not correspond to DAI=1: ARI value
   iii. DL grant that schedules an SCell: fixed value
4) TDD with CHsel
A. TPC field
   i. DL grant that schedules a PCell: TPC value
   ii. DL grant that schedules an SCell: ARI value
B. ARO field
   i. DL grant transmitted through a PCell: ARO value
   ii. DL grant transmitted through an SCell: fixed value Meanwhile, aggregation of a plurality of CCs having different SF configurations as well as aggregation of a plurality of CCs having the same SF configuration can be performed. For example, aggregation of a plurality of CCs having different SF configurations includes aggregation of a plurality of CCs having different UL-DL Configurations (referred to as different TDD CA for convenience), and aggregation of TDD CC and FDD CC.

Cross-CC scheduling may be supported even when a plurality of CCs having different SF configurations are aggregated. In this case, UL grant/PHICH timing (see FIGS. 11 and 12) configured for an MCC and SCC may be different. Therefore, to transmit a UG/PHICH for UL data transmitted through an MCC UL SF, and an SCC UL SF cross-CC-scheduled through the MCC, the same or different UG/PHICH timing (set to a specific UL-DL configuration) may be applied per CC or UG/PHICH timing configured for the specific UL-DL configuration may be commonly applied to all CCs (i.e., PCC (or MCC) and SCC). The specific UL-DL configuration (hereinafter, referred to as a reference configuration (Ref-Cfg)) may correspond to a UL-DL configuration (MCC-Cfg) set to the PCC (or MCC) or a UL-DL configuration (SCC-Cfg) set to the SCC or may be determined as a UL-DL configuration other than MCC-Cfg and SCC-Cfg. In this case, UG or PHICH timing may refer to D configured to transmit/receive a UG that schedules UL data of a specific U and a PHICH for transmission of the corresponding UL data or timing relationship thereof. Specifically, application of UL grant or PHICH timing set to the specific CC (i.e. Ref-CC) or specific UD-cfg (i.e. Ref-cfg) may refer to use of UD-Cfg of the specific CC or a parameter value corresponding to the specific UD-cfg in Tables 7 and 8.

Meanwhile, when PDCCH/PDSCH-to-ACK/NACK timing (e.g., 4 ms) defined in the legacy FDD cell is applied to a PDSCH of a FDD cell in TDD PCell-FDD SCell CA, ACK/NACK cannot be transmitted if the TDD PCell is defined by a DL subframe at ACK/NACK transmission timing. Therefore, a new DL HARQ timing not the PDCCH/PDSCH-to-ACK/NACK timing defined in the legacy FDD cell may be applied. Likewise, a new HARQ timing may also be applied to UL HARQ timing. Currently possible HARQ timings are summarized as follows.

1) DL HARQ timing (PDSCH to HARQ-ACK timing) for TDD SCell in case of FDD PCell
A. Self-scheduling case: follow DL HARQ timing of FDD PCell
B. Cross-carrier scheduling case: follow DL HARQ timing of FDD PCell 2) UL HARQ timing (UL grant DCI to PUSCH, PUSCH to PHICH) for TDD SCell in case of FDD PCell
  A. Self-scheduling case: follow UL HARQ timing of TDD scheduled cell timing
  B. Cross-carrier scheduling case
    i. Option UL-A1:
      1. For FDD scheduling case, follow TDD scheduled cell timing
      2. For TDD scheduling cell case, reference U/D configuration for UL timing is derived by scheduling and scheduled cells U/D configuration following Rel-11 LTE rule.
    ii. Option UL-B1
      1. For FDD scheduling cell case, 4 ms for UL grant to PUSCH, 6 ms for PUSCH to PHICH
      2. For TDD scheduling case, reference U/D configuration for UL timing is derived by scheduling and scheduled cells U/D configuration following Rel-11 LTE rule.
  B. Cross-carrier scheduling case
    i. Option UL-A2:
      1. For TDD scheduling cell case, follow scheduling cell timing
      2. For FDD scheduling cell case, follow FDD timing
    ii. Option UL-B2:
      1. For TDD scheduling cell case, 4 ms for UL grant to PUSCH, 6 ms for PUSCH to PHICH
      2. For FDD scheduling cell case, follow FDD timing Table 11 illustrates examples of HARQ timing (e.g., DASI) according to DL HARQ option 1. In Table 10, HARQ timing means type/index of HARQ timing configured for TDD PCell U/D configuration, and [ ] means a DASI newly generated for the TDD PCell U/D configuration. Tables 12 to 14 illustrate examples of reference U/D configuration applicable to the FDD SCell in DL HARQ option 2.

TABLE 11

| TDD PCell UL-DL Cfg | HARQ timing | subframe n | | | | | | | | | |
|---|---|---|---|---|---|---|---|---|---|---|---|
| | | 0 | 1 | 2 | 3 | 4 | 5 | 6 | 7 | 8 | 9 |
| 0 | 0A | — | — | 6, [5] | [5], [4] | 4 | — | — | 6, [5] | [5], [4] | 4 |
| 0 | 0B | — | — | 6, [5], [4] | | [5], 4 | | | 6, [5], [4] | | [5], 4 |
| 1 | 1 | — | — | 7, 6, [5] | [5], 4 | — | — | — | 7, 6, [5] | [5], 4 | — |
| 1 | 1* | | | 7, 6 | [6], [5], 4 | | | | 7, 6 | [6], [5], 4 | |
| 2 | 2 | — | — | 8, 7, 6, [5], 4 | — | | — | — | 8, 7, 6, [5], 4 | — | — |
| 3 | 3 | — | — | 11, [10], [9], [8], 7, 6 | 6, 5 | 5, 4 | — | — | — | — | — |
| 3 | 3a | — | — | 11, [10], 7, 6 | [10], 6, 5 | [10], 5, 4 | | | | | |
| 4 | 4 | — | — | 12, 11, [10], [9], 8, 7 | 7, 6, 5, 4 | | | | | | |
| 4 | 4a | | | 12, 11, [10], 8, 7 | [10], 7, 6, 5, 4 | | | | | | |
| 5 | 5 | — | — | 13, 12, 11, [10], 9, 8, 7, 6, 5, 4 | — | — | — | — | — | — | — |
| 6 | 6 | — | — | [8], 7 | 7, [6] | [6], 5 | — | — | 7 | 7, [6], [5] | — |
| 6 | 6* | — | — | 7 | 7, [6], [5] | 5 | | — | — | 7, [6], [5], [4] | 7 | — |

3. DL HARQ timing (PDSCH to HARQ-ACK timing) for FDD SCell in case of TDD PCell
  A. Self-scheduling case
    i. Option 1: for each TDD PCell U/D configuration, follow TDD PCell timing+additional new timings for the DL subframes for which DL HARQ timing is not defined in TDD PCell timing (or new timings for each TDD PCell U/D configuration to address more DL subframes than defined in TDD PCell)
    ii. Option 2: Follow reference U/D configuration defined (or configured) for the FDD SCell. (Configurable) reference U/D configuration depends on the TDD PCell's U/D configuration. (new timing can be added to the reference U/D configuration to support more DL subframes with HARQ-ACK feedback)
  B. Cross-carrier scheduling case: same options (option 1 and option 2) as in self-scheduling case, or else, only follow TDD PCell timing
4) UL HARQ timing (UL grant DCI to PUSCH, PUSCH to PHICH) for FDD SCell in case of TDD PCell
  A. Self-scheduling case: follow FDD scheduled cell timing

TABLE 12

| TDD PCell U/D cfg | Allowed reference configuration for FDD SCell |
|---|---|
| 0 | {0, 1, 2, 3, 4, 5, 6} |
| 1 | {1, 2, 4, 5} |
| 2 | {2, 5} |
| 3 | {3, 4, 5} |
| 4 | {4, 5} |
| 5 | {5} |
| 6 | {1, 2, 3, 4, 5, 6} |

TABLE 13

| TDD PCell U/D cfg | Allowed reference configuration for FDD SCell |
|---|---|
| 0 | {2, 4, 5} |
| 1 | {2, 4, 5} |
| 2 | {2, 5} |
| 3 | {4, 5} |
| 4 | {4, 5} |

TABLE 13-continued

| TDD PCell U/D cfg | Allowed reference configuration for FDD SCell |
|---|---|
| 5 | {5} |
| 6 | {2, 4, 5} |

TABLE 14

| TDD PCell U/D cfg | Allowed reference configuration for FDD SCell (2 aggregated cells) | Allowed reference configuration for FDD SCell (more than 2 aggregated cells) |
|---|---|---|
| 0 | 5 | 2 |
| 1 | 5 | 2 |
| 2 | 5 | 2 |
| 3 | 5 | 4 |
| 4 | 5 | 4 |
| 5 | 5 | Not applicable |
| 6 | 5 | 2 |

EMBODIMENT

Control Information Allocation/Transmission During Dynamic Subframe Reconfiguration In the post-LTE system, an operation scheme for dynamically reconfiguring/changing a UL/DL SF direction for the purpose of performing enhanced interference mitigation and traffic adaptation (i.e., eIMTA) in a TDD status is considered. To this end, a method of configuring basic UL-DL configuration (UD-cfg) of a TDD cell (or CC) semi-statically using higher layer signaling (e.g., SIB) and then dynamically reconfiguring/changing operation UD-cfg of the corresponding cell (or CC) using lower layer signaling (e.g., L1 (Layer 1) signaling (e.g., PDCCH)) is considered. For convenience, basic UD-cfg will be referred to as SIB-cfg, and operation UD-cfg will be referred to as actual-cfg. Subframe configuration based on UD-cfg is based on Table 1. Also, in the present invention, a DL SF, a UL SF, and a special SF will be referred to as D, U and S, respectively.

In this regard, reconfiguration of D from D to U (or S) (D=>U (or S)) may not be easy or may be degraded when DL reception/measurement of a legacy UE based on a CRS in the corresponding D is considered, whereas reconfiguration from U (or S) to D (U (or S)=>D) may provide an eIMTA UE of additional DL resource as an eNB does not intentionally perform scheduling/configuration of a UL signal, which may be transmitted from the legacy UE through the corresponding U.

Considering this, actual-cfg may selectively be selected from UD-cfg (including SIB-cfg) which include all of Ds on SIB-cfg. That is, although UD-cfg in which Ds are all arranged in positions of D on SIB-cfg may be determined as actual-cfg, UD-cfg where U is arranged in a position of D on SIB-cfg cannot be determined as actual-cfg. Meanwhile, in eIMTA, reference UD-cfg (hereinafter, D-ref-cfg) may separately be configured by higher layer (signaling) to set HARQ timing (e.g., HARQ-ACK feedback transmission timing) for DL scheduling. Considering this, actual-cfg may selectively be determined from UD-cfgs (including D-ref-cfg) including all of U on D-ref-cfg. Therefore, UD-cfg where D is arranged in a position of U on D-ref-cfg cannot be determined as actual-cfg.

Therefore, D-ref-cfg may be configured as UD-cfg that includes all of Ds on possible actual-cfg candidates, and SIB-cfg may be configured as UD-cfg which include all of Us on possible actual-cfg candidates. That is, D-ref-cfg may be configured as D superset UD-cfg for possible actual-cfg candidates, and SIB-cfg may be configured as U superset UD-cfg for possible actual-cfg candidates. Reference UD-cfg (hereinafter, U-ref-cfg) of HARQ timing (e.g., UG/PUSCH/PHICH transmission timing) for UL scheduling may be configured as SIB-cfg. Therefore, U on D-ref-cfg may be considered as fixed U, and D on SIB-cfg may be considered as fixed D. Therefore, SF which is D on D-ref-cfg and U on SIB-cfg may be considered as flexible U which may be reconfigured/changed to U=>D. The flexible U may be reconfigured/changed to U=>D by actual-cfg.

That is, after SIB-cfg/D-ref-cfg is configured by higher layer (signaling), one of UD-cfg(s) which include all of Ds on SIB-cfg and all of Us on D-ref-cfg may be configured as actual-cfg by L1 signaling.

Meanwhile, even in an FDD system, eIMTA may be applied in such a manner that some UL SF on UL carrier is reconfigured as DL SF (and/or special SF). As an example, an operation method for (dynamically) reconfiguring/changing UL SF on UL carrier to specific TDD UL-DL configuration may be considered.

Figures 17, 18:
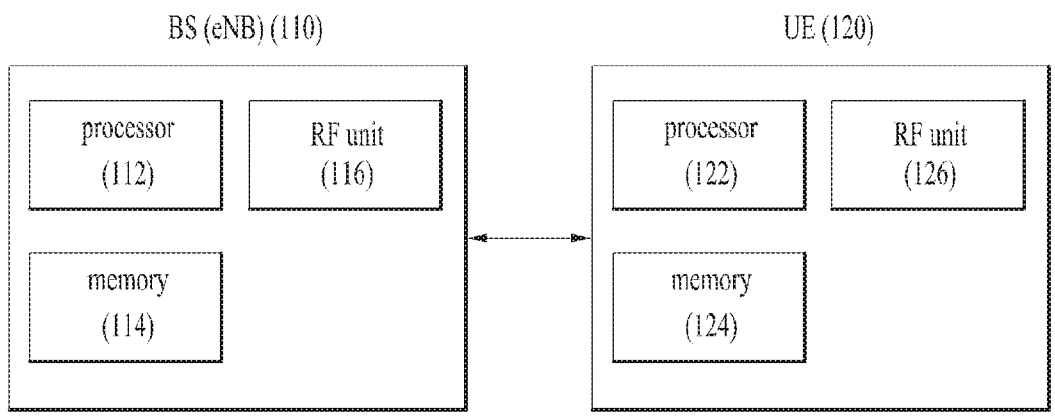
FIG. 17 illustrates TDD UD-cfg (Time Division Duplex Uplink Downlink configuration) based FDD eIMTA (Frequency Division Duplex enhanced Interference Mitigation and Traffic Adaptation) system.
FIG. 18 illustrates a base station and a user equipment applicable to an embodiment of the present invention.

FIG. 17 illustrates FDD eIMTA scheme based on TDD UD-cfg. Referring to FIG. 17, UL resource of an FDD cell may dynamically be reconfigured using L1 signaling (e.g., PDCCH). In this example, it is assumed that SF configuration of UL CC is reconfigured in accordance with UD-cfg#1. Therefore, PDSCH transmission can be performed on UL CC, whereas PUSCH/PUCCH transmission is restricted. UD-cfg (that is, actual-cfg) for dynamic SF reconfiguration on UL CC may be signaled at a certain period. For convenience, in the following description, DL SF on DL CC will be referred to as D1, and reconfigured SF (i.e., SF reconfigured to UL SF=>DL SF or S SF) on UL CC will be referred to as D2.

As UL resource of UL CC is dynamically changed in an FDD cell, a method for determining and defining HARQ timing for PDSCH scheduling transmitted on DL/UL CC and PUSCH scheduling transmitted on UL CC and actual-cfg for SF configuration on UL CC may be required. Hereinafter, a method (e.g., method for determining actual-cfg) for reconfiguring/changing HARQ timing for FDD eIMTA system and SF is suggested. For convenience, although an FDD eIMTA scheme for reconfiguring/changing UL CC resource to UL/DL SF configuration based on TDD UD-cfg is described, this is exemplary, and the present invention may similarly be applied to all FDD eIMTA schemes for reconfiguring/changing UL CC resource to random UL/DL SF configuration.

■PDSCH HARQ Timing for UL CC (i.e. D-Ref-UC)

DL HARQ timing (hereinafter, D-ref-UC) for PDSCH on UL CC may previously be defined or may be configured through higher layer signaling (e.g., RRC) as one of specific TDD UD-cfgs (e.g., UD-cfg 2/3/4/5) comprised of relatively more DL resources. Therefore, DL HARQ timing depends on parameters (e.g., Table 5) defined for D-ref-UC.

Meanwhile, a DL DAI field may additionally be configured for a DG (DL grant) DCI format that schedules a PDSCH on UL CC, and a DL DAI value may be indicated through this field. By contrast, the DL DAI field may not be configured for a DG DCI format that schedules a PDSCH on DL CC. Also, a HARQ process number (i.e., HARQ-num) field size included in the DG DCI format, which schedules a PDSCH on UL CC, may be configured in the same manner (e.g., 4 bits) as a TDD case. By contrast, a HARQ process number field size included in the DG DCI format, which schedules a PDSCH on DL CC, may be configured in the same manner (e.g., 3 bits) as an FDD case. Also, an aperiodic SRS request field may additionally be configured for a specific DG DCI format (e.g., DCI format 2B/2C/2D), which schedules a PDSCH on UL CC, and the eNB may instruct the UE to perform SRS transmission through this field.

Meanwhile, only a USS may be configured on D which is reconfigured on UL CC, and a CSS may not be configured on the D. This is to obtain more chances of using additional function that may be configured on the USS (DCI format) only because RRC reconfiguration is not performed through UL CC. Also, the UE may be operated on the assumption that CSS based scheduling is restricted to be performed only once within a TDD bundling window corresponding to one HQRQ-ACK transmission timing, and/or may be performed through D1 with legacy timing only. For example, the UE may monitor the CSS and the USS at D1 with legacy timing, and may monitor the USS only at other DL SF (D1 with non-legacy timing, D2). Legacy timing indicates a timing offset (e.g., 4 msec or 4 SFs) relation between PDCCH/PDSCH transmission on DL CC in the legacy FDD system and HARQ-ACK transmission on UL CC corresponding to the PDCCH/PDSCH transmission.

Meanwhile, for DL signal configuration in the D which is reconfigured on the UL CC, i) a CRS transmission related parameter applied on the DL CC may be used as it is, or ii) a separate CRS transmission related parameter may be configured. The separate CRS transmission related parameter may include information on at least one of the number of CRS antenna ports, a CRS frequency shift (i.e., V-shift) value, and (virtual) cell ID (or its corresponding parameter). Therefore, a separate PBCH may not be configured/transmitted through the D which is reconfigured on the UL CC.

Also, PSS/SSS signal transmission resources (e.g., subframe number, symbol index) for performing DL synchronization on the UL CC may be configured i) in the same manner as TDD in accordance with SF reconfiguration on the UL CC based on TDD UD-cfg, or may be configured in the same manner as FDD to avoid unnecessary cell search of another UE operated in TDD, or iii) a separate resource may be configured to avoid collision with another DL signal (e.g., CSI-RS, DMRS) transmission. The separate resource for DL synchronization may previously be defined or may be configured through higher layer (e.g., RRC) signaling. In FDD, PSS is located at the last OFDM symbol of slot#0/#10, and SSS is located at a previous OFDM symbol prior to the last OFDM symbol of slot#0/#10. In TDD, PSS is located at the third OFDM symbol of subframe#1/#6, and SSS is located at the last OFDM symbol of slot#1/#11.

Meanwhile, a DL synchronization signal transmitted on the UL CC may not be intended for cell search, whereby i) one PSS/SSS pair may be transmitted, or ii) PSS signal may only be transmitted, or iii) SSS signal may only be transmitted, within one radio frame.

Meanwhile, CSI-RS and DMRS in D reconfigured on the UL CC and EPDDCH signal may be configured/transmitted i) based on a structure applied to TDD in accordance with TDD UD-cfg-based SF reconfiguration, or ii) may be configured/transmitted based on a structure applied to TDD for some specific D including a special SF (and/or PSS/SSS) and configured/transmitted based on a structure applied to FDD for the other D.

■ PDSCH HARQ Timing for DL CC (Hereinafter, D-Ref-DC)

DL HARQ timing (D-ref-UC) for a PDSCH on DL CC may be configured in the same manner as DL HARQ timing of an Scell in a CA status between a TDD Pcell and an FDD Scell, which have the same UD-cfg as the above D-ref-UC (for example, Tables 11 to 14) ("Alt 1"), or may previously be defined or may be configured through higher layer (e.g., RRC) signaling as one of specific TDD UD-cfgs (e.g., UD-cfg 2/3/4/5) comprised of relatively more DL resources ("Alt 2").

Meanwhile, a DL DAI field may additionally be configured for a DG DCI format that schedules a PDSCH on DL CC, and a DL DAI value may be indicated through this field. Also, a HARQ-num field size within the corresponding DG DCI format that schedules a PDSCH on the DL CC may be configured in the same manner (e.g., 4 bits) as a TDD case. Also, an aperiodic SRS request field may additionally be configured for a specific DG DCI format (e.g., DCI format 2B/2C/2D), which schedules a PDSCH on the DL CC, and the eNB may instruct the UE to perform SRS transmission through this field.

Meanwhile, field configuration related to the above DCI format and its corresponding signaling may restrictively be applied to the DCI format (hereinafter, USS DCI format) only configured on the USS. That is, the DCI format (hereinafter, CSS DCI format) configured on the CSS may maintain field configuration of a CSS DCI format of the legacy FDD to avoid error operation caused by mismatching/ambiguity between UE and eNB at RRC reconfiguration interval (for example, No DL DAI field, 3-bit HARQ-num field). In this case, since the DL DAI field exists in the USS DCI format only, HARQ-ACK response to a PDSCH scheduled by the CSS DCI format may be defined/configured to be fixed to a specific position within ACK/NACK payload (for PF3) or ACK/NACK state (for CHsel). The specific position may be defined at a position corresponding to initial or final DL DAI value associated with corresponding DL CC, or may correspond to initial or final HARQ-ACK response. Also, since HARQ-num field size of the CSS DCI format is smaller than HARQ-num field size of the USS DCI format, a HARQ-num field value signaled through the CSS DCI format may also be configured/defined to correspond to some specific values (for example, 8 from a minimum value (e.g., 1 to 8)) of all HARQ process numbers.

Also, the UE may be operated on the assumption that CSS based scheduling is restricted to be performed only once within a TDD bundling window corresponding to one HQRQ-ACK transmission timing, and/or may be performed through D1 with legacy timing only. For example, the UE may monitor the CSS and the USS at D1 with legacy timing, and may monitor the USS only at other DL SF (D1 with non-legacy timing, D2).

■ PUSCH HARQ Timing for UL CC (Hereinafter, U-Ref-UC)

UL HARQ timing (U-ref-UC) for a PUSCH on UL CC may be configured in the same manner as UL HARQ timing of an Scell in FDD PCell-TDD SCell CA or TDD PCell-FDD SCell CA (e.g., 4 ms for UL grant to PUSCH, 6 ms for PUSCH to PHICH) ("Alt 1"), or may previously be defined or may be configured through higher layer (e.g., RRC) signaling as one of specific TDD UD-cfgs (e.g., UD-cfg 0/1/6) comprised of relatively more UL resources ("Alt 2"). Alt 1 may be suitable for the status that UL CC is configured to be scheduled from DL CC, and Alt 2 may be suitable for the status that UL CC is configured to be scheduled from itself.

Meanwhile, a UL DAI field may additionally be configured for a UG (UL grant) DCI format that schedules a PUSCH on UL CC (e.g., Alt 1), or a UL DAI or UL index field may additionally be configured in accordance with U-ref-UC (e.g., Alt 2), and a UL DAI or UL index value may be indicated through the corresponding field. If actual-cfg is UD-cfg#0, the UL index field may be configured within the UG DCI format, and if actual-cfg is not UD-cfg#0, the UL DAI field may be configured within the UG DCI format. On the other hand, the UL DAI/UL index field may not be configured in the UG DCI format transmitted through the DL CC which schedules a PUSCH on UL CC. Also, an aperiodic CSI request field within the UG DCI format i) may be configured to always report CSI to both DL CC and UL CC in a state that 1-bit is maintained or ii) may be comprised of 2-bit to be configured to allow a UE to report CSI to DL CC and/or UL CC (for example, each bit may be used to indicate independent CSI request for each of DL/UL CC). For example, in the CSI request field, the first bit may request CSI for DL CC, and the second bit may request CSI for UL CC (or DL/UL CC).

Meanwhile, field configuration related to the UG DCI format and its corresponding signaling may restrictively be applied to the USS DCI format only. That is, the CSS DCI format may maintain a CSS DCI format field configuration in the legacy FDD (for example, No UL DAI/index field and 1-bit aperiodic CSI request field) to avoid error operation caused by mismatching/ambiguity between UE and eNB at RRC reconfiguration interval. The UL index field is used to indicate UL SF, to which PUSCH is transmitted, among a plurality of UL SFs corresponding to the UG DCI format. In this example, if it is considered that the UL index field is configured for the USS UG format only, a PUSCH transmission timing scheduled from the CSS DCI format may be defined/configured to be fixed to a specific UL SF (for example, SF (e.g., the first or last UL SF) corresponding to a specific UL index value). Also, the PUSCH transmission timing may be configured/defined to request only a CSI report for a specific CC (e.g., DL CC) through the CSS DCI format.

Also, the UE may be operated on the assumption that CSS based scheduling is restricted to be performed only once within a TDD bundling window corresponding to one HQRQ-ACK transmission timing, and/or may be performed through D1 with legacy timing only. For example, the UE may monitor the CSS and the USS at D1 with legacy timing, and may monitor the USS only at other DL SF (D1 with non-legacy timing, D2).

▌UL-DL Reconfiguration for UL CC (i.e. Actual-Cfg)

UL-DL configuration (i.e., actual-cfg) for dynamic SF reconfiguration on UL CC may selectively be determined from UD-cfgs and/or UD-cfgs (UD-cfgs where Us are all arranged on positions of U on D-ref-UC) including all of Us on D-ref-UC in SF configurations (i.e., UL-only-cfg) of which SFs are comprised of UL only. That is, UD-cfg where D is arranged on a position of U on D-ref-UC may be excluded when actual-cfg is determined.

Also, actual-cfg may selectively be determined from UD-cfgs and/or UD-cfgs including all of Ds on U-ref-UC among UL-only-cfg. That is, UD-cfg where U is arranged on a position of D on U-ref-UC may be excluded when actual-cfg is determined.

Meanwhile, for actual-cfg based SF configuration, special SF (S SF) configuration applied to UL CC may be configured through higher layer (e.g., RRC) signaling. In this case, the S SF configuration may include time/the number of symbols corresponding to DwPTS or DL interval and time/the number of symbols corresponding to UpPTS or UL interval. Preferably, UL the UpPTS or UL interval may not be configured for the S SF on UL CC. Additionally, a CP length (e.g., normal CP or extended CP) for DL signal/channel reception on the UL CC i) may be configured independently through higher layer (e.g., RRC) signaling, or ii) may be configured equally to a DL CP length applied to DL CC or UL CP length applied to UL CC.

Meanwhile, a TA offset parameter (i.e., $N_{TA\ offset}$) between UL frame transmission start timing applied during UL signal (for example, PRACH preamble) transmission on UL CC and DL frame reception start timing may be set to i) a value (e.g., 624) greater than 0 considering TDD transmission and reception (switching) operation (at UE), or ii) may be set to 0 in accordance with FDD and then configured/assumed such that DL frame transmission (from eNB) may start after delay.

▌Fallback Operation in Case of Missing Actual-Cfg actual-cfg for dynamic SF reconfiguration on UL CC may be signaled with a certain period, and a UE may fail to detect corresponding actual-cfg. In this case, the UE may be operated (i.e., fallback operation) in a state that previously determined default UD-cfg is assumed/regarded as actual-cfg. In this case, the corresponding default UD-cfg may be configured as UL-only-cfg or U-ref-UC, and every HARQ timing associated with PDSCH/PUSCH scheduling of DL/UL CC may be maintained as it is (for example, the D-ref-UC, D-ref-DC, and U-ref-UC may be applied as they are). In this case, UL channel/signal transmission on UL CC may be restricted to be performed through only SF corresponding to U on the U-ref-UC or only SF corresponding to U on the D-ref-UC.

FIG. 18 illustrates a BS and a UE of a wireless communication system, which are applicable to embodiments of the present invention. When the wireless communication system includes a relay, the BS or UE can be replaced by the relay.

Referring to FIG. 18, the wireless communication system includes a BS 110 and a UE 120. The BS 110 includes a processor 112, a memory 114 and a radio frequency (RF) unit 116. The processor 112 may be configured to implement the procedures and/or methods proposed by the present invention. The memory 114 is connected to the processor 112 and stores information related to operations of the processor 112. The RF unit 116 is connected to the processor 112 and transmits and/or receives an RF signal. The UE 120 includes a processor 122, a memory 124 and an RF unit 126. The processor 122 may be configured to implement the procedures and/or methods proposed by the present invention. The memory 124 is connected to the processor 122 and stores information related to operations of the processor 122. The RF unit 126 is connected to the processor 122 and transmits and/or receives an RF signal. The BS 110 and/or the UE 120 may include a single antenna or multiple antennas.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'Mobile Station (MS)', 'Mobile Subscriber Station (MSS)', 'mobile terminal', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention is applicable to a UE, BS or other apparatuses (e.g. a relay) of a wireless communication apparatus. Specifically, the present invention is applicable to a method for transmitting control information and an apparatus for the same.

The invention claimed is:
1. A method for a user equipment (UE) to transmit control information through a frequency division duplex (FDD) cell, which includes an uplink component carrier (UL CC) and a downlink CC (DL CC), in a wireless communication system, the method comprising:
  receiving reconfiguration information for the UL CC of the FDD cell, wherein the reconfiguration information indicates a first UL-DL configuration;
  reconfiguring UL subframes on the UL CC of the FDD cell based on the first UL-DL configuration, wherein the first UL-DL configuration indicates one of UL-DL configurations of Table 1;
  monitoring at least one of a common search space (CSS) or a UE-specific search space (USS) in a reconfigured DL subframe #(n−k) on the UL CC of the FDD cell, to receive a physical downlink control channel (PDCCH) including downlink control information (DCI);
  receiving, on the UL CC of the FDD cell, a physical downlink shared channel (PDSCH) in the reconfigured DL subframe #(n−k) based on the PDCCH; and
  transmitting, on the UL CC of the FDD cell, ACK/NACK information for the PDSCH in a non-reconfigured UL subframe #k,
  wherein when the reconfigured DL subframe #(n−k) corresponds to a subframe #(n−4), the CSS and the USS are all monitored by the UE, and when the reconfigured DL subframe #(n−k) does not correspond to the subframe #(n−4), only the USS is monitored by the UE, and
  wherein the Table 1 is given as follows:

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D. |

2. The method according to claim 1,
wherein k is an element of a set K for a reference UL-DL configuration, the set K is defined in Table 2 and the reference UL-DL configuration is predetermined as one of UL-DL configurations 2 to 5, and
wherein the Table 2 is given as follows:

| TDD UL-DL Configuration | 0 | 1 | 2 | 3 | 4 | 5 | 6 | 7 | 8 | 9 |
|---|---|---|---|---|---|---|---|---|---|---|
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | —. |

3. A user equipment (UE) configured to transmit control information through a frequency division duplex (FDD) cell, which includes an uplink component carrier (UL CC) and a downlink CC (DL CC), in a wireless communication system, the UE comprising:
a radio frequency (RF) unit; and
a processor,
wherein the processor is configured to:
receive reconfiguration information for the UL CC of the FDD cell, wherein the reconfiguration information indicates a first UL-DL configuration;
reconfigure UL subframes on the UL CC of the FDD cell based on the first UL-DL configuration, wherein the first UL-DL configuration indicates one of UL-DL configurations of Table 1;
monitor at least one of a common search space (CSS) or a UE-specific search space (USS) in a reconfigured DL subframe #(n-k) on the UL CC of the FDD cell, to receive a physical downlink control channel (PDCCH) including downlink control information (DCI), (DCI);
receive, on the UL CC of the FDD cell, a physical downlink shared channel (PDSCH) in the reconfigured DL subframe #(n-k) based on the PDCCH; and
transmit, on the UL CC of the FDD cell, ACK/NACK information for the PDSCH in a non-reconfigured UL subframe #k,
wherein when the reconfigured DL subframe #(n-k) corresponds to a subframe #(n-4), the CSS and the USS are all monitored by the UE, and when the reconfigured DL subframe #(n-k) does not correspond to the subframe #(n-4), only the USS is monitored by the UE, and
wherein the Table 1 is given as follows:

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D. |

4. The UE according to claim 3,
wherein k is an element of a set K for a reference UL-DL configuration, the set K is defined in Table 2 and the reference UL-DL configuration is predetermined as one of UL-DL configurations 2 to 5, and
wherein Table 2 is given as follows:

| TDD UL-DL Configuration | 0 | 1 | 2 | 3 | 4 | 5 | 6 | 7 | 8 | 9 |
|---|---|---|---|---|---|---|---|---|---|---|
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | —. |

* * * * *